United States Patent [19]

Shimizu

[11] Patent Number: 5,173,010
[45] Date of Patent: Dec. 22, 1992

[54] CABLE LAYING METHOD, DEVICE AND APPARATUS

[75] Inventor: Shohachi Shimizu, Gifu, Japan

[73] Assignee: Mirai Industry Co., Ltd., Gifu, Japan

[21] Appl. No.: 635,753

[22] Filed: Dec. 28, 1990

[30] Foreign Application Priority Data

Dec. 30, 1989 [JP] Japan .................. 1-344457

[51] Int. Cl.⁵ .............................. F16L 1/00
[52] U.S. Cl. .................... 405/154; 52/221;
138/107; 248/49; 248/68.1; 405/303
[58] Field of Search .......... 405/154, 195, 203, 202,
405/204, 207, 168, 169–171; 138/107; 248/49,
68.1; 254/134.3 FS; 52/220, 221; 175/53;
174/48, 49, 68.3, 97

[56] References Cited

U.S. PATENT DOCUMENTS

| | | | |
|---|---|---|---|
| 2,824,576 | 2/1958 | Jensen et al. | 174/68.3 |
| 2,837,324 | 6/1958 | Ashacker | 175/53 |
| 3,233,850 | 2/1966 | Merker et al. | 248/49 |
| 4,271,908 | 6/1981 | Robinson et al. | 174/47 X |
| 4,342,519 | 8/1982 | Botrel et al. | 405/169 |
| 4,625,631 | 12/1986 | Vera | 138/107 X |
| 4,771,699 | 9/1988 | Kaiserfeldt | 405/78 X |
| 4,793,594 | 12/1988 | Kumpf | 254/134.3 FT |

Primary Examiner—Dennis L. Taylor
Attorney, Agent, or Firm—John Lezdey

[57] ABSTRACT

The present invention sets forth methods and devices to lay a cable or cables efficiently as well as easily and economically on a cable receiver attached to a wall by means of hanging bolts or the like. A chute or chutes are provided extending along the cable route. A cable laying kit comprising a shuttle and a rope is to be inserted in the chute. The rope ought to be hard enough to push itself in the chute. A cable or a second rope for tracting a cable is then connected to the shuttle. The cable is dragged onto the cable receiver as the shuttle or the second rope is drawn in the chute.

9 Claims, 48 Drawing Sheets

5,173,010

CABLE LAYING METHOD, DEVICE AND APPARATUS

BACKGROUND OF THE INVENTION

This invention relates generally to methods, devices and apparatus for laying cables. More particularly, this invention relates to methods, devices and apparatus for laying cables additionally or newly inside and/or outside a building, a factory, a station or the like.

Presently, a plurality of cables are laid on a installed cable ladder or ladders(L).

Conventionally, as shown in FIG. 102, cable layers pull up and drag a cable(C) on cable ladders(L).

Alternatively, as shown in FIGS. 103 and 104, cable layers first lay a messenger rope(R) through a cable ladder(L). The messenger rope(R) is then connected to the cable(C) and dragged by a traction motor(M).

In order to lay a cable(C) at a high position by the process as shown in FIG. 102, a greater number of cable layers are required for the operation, and ladder hanging bolts(B) often hinder the operation, requiring more time and cost for the operation.

In order to lay a cable(C) by the processes as shown in FIGS. 103 and 104, a messenger rope(R) must be dragged by cable layers who have to change positions as required, and in order to lay a plurality of cables(C), these processes have to be repeated. Ladder hanging bolts(B) hinder the operation in these cases as well.

Japanese patent publication No. 63-144707, laid open unexamined, discloses a resolution to those problems, in which a guide wire is installed like a loop preparedly on a cable ladder. A messenger rope and a cable connected to the messenger rope are dragged on the cable ladder as the guide wire connected to the messenger rope is dragged. This device, however, requires a complicated set of apparatus and their strenuous installation.

Japanese patent publication Nos. 61-23182 and 63-18911, laid open unexamined, also disclose a resolution to the aforementioned problems. The devices disclosed in those publications use draggers at certain intervals along the cable route which pass on a guide bar to which a cable is connected.

This type of device does not require the use of a messenger rope, however, a plurality of draggers and their strenuous installation are required. The removal work of the draggers is also strenuous. The apparatus to securely guide a guide bar from dragger to dragger are costly as well.

Therefore, it has been desired to have a method, a device and an apparatus which enable an efficient and easy operation for laying a cable or cables which are often as long as 100 meters.

SUMMARY OF THE INVENTION

Accordingly, it is a primary object of this invention to provide methods for laying cables and the devices as well as the apparatus which make it possible to easily, efficiently and economically lay cables.

It is another object of this invention to provide methods for laying cables and the devices as well as the apparatus which make it possible to easily, efficiently and economically lay cables in addition to existing cables.

For the sake of providing better understanding, drawings and numerals corresponding to each member are referred to hereinafter to describe each aspect of the invention. The drawings and the members represented by the numerals, however, must be considered as illustrative and not restrictive, and the present invention must be considered as claimed in the appended claims and may be modified within the scope of the appended claims.

The processes of laying cables according to the present invention are represented by the following groups of Figures: FIGS. 1 to 5, FIGS. 6 to 12, FIGS. 13 to 18 and FIGS. 19 to 24.

The group of FIGS. 1 to 5 shows a first process. As shown in FIG. 1, a cable receiver 1 to receive a cable(C) and a chute 2 with a slit in the longitudinal direction are attached either on a wall or hung from a ceiling. Chutes 2 are successively connected with one another and distributed over cable receivers 1.

As shown in FIG. 2, a shuttle 3 with a rope 4 which is hard enough to push itself into a chute is inserted into the chute 2 at a starting point(S). As shown in FIG. 3, a cable(C) is connected to the shuttle 3 at an ending point(E). As shown in FIG. 4, the shuttle 3 is drawn back to the starting point(S) and the cable(C) connected to the shuttle 3 is drawn onto the cable receiver 1. Then as shown in FIG. 5, the cable(C) is released from the shuttle 3 to be laid on the cable receiver 1.

A starting point(S) and an ending point(E) can be some other places of a chute 2. For example, they can be at a winding corner of a chute 2 in case the chute 2 is not straight. In such a case, a starting point(S) and an ending point(E) are identical, which means that a starting point(S) also becomes an ending point(E) for the subsequent cable laying operation.

Even in the case of a straight chute 2, a starting point(S) and an ending point(E) can also be in a middle point of the chute 2. In such a case, too, a starting point(S) and an ending point(E) are identical.

The group of FIGS. 6 to 12 shows a second process. As shown in FIG. 6, a cable receiver 1 to receive a cable(C) and a chute 2 with a slit in the longitudinal direction are attached either on a wall or a ceiling. As shown in FIG. 7, a shuttle 3 with a rope 4 is inserted into a chute 2 at a starting point(S).

As shown in FIG. 8, a second rope 8 is connected to a shuttle 3 at an ending point(E). As shown in FIG. 9, as the second rope 8 is dragged, the shuttle 3 is also dragged and comes back to the starting point(S). As such, the second rope 8 is laid on a cable receiver 1 between the starting point(S) and the ending point(E).

The second rope 8 is released from the shuttle 3, as shown in FIG. 10, and the second rope 8 is drawn by a traction motor 100, as shown in FIG. 11, and a cable(C) connected to the second rope 8 is drawn onto a cable receiver 1.

A second rope 8 and a cable(C) may be connected either before the second rope 8 is laid on a cable receiver 1 or after the second rope 8 is laid on a cable receiver 1. Or a second rope 8 and a cable(C) may be preparedly connected.

As shown in FIG. 12, the cable(C) is laid on the cable receiver 1 after the removal of the cable(C) from the second rope 8.

The group of FIGS. 13 to 18 shows a third process. As shown in FIG. 13, a cable receiver 1 to receive a cable(C) and a chute 2 with a slit are either attached on a wall or hung from a ceiling. As shown in FIG. 14, a second rope 8 is connected to a shuttle 3 to which a rope 4 is connected, and the shuttle 3 is inserted into the chute 2 at a starting point(S). The second rope 8 is released from the shuttle 3 at an ending point(E) after the shuttle 3 reaches the ending point(E), as shown in FIG. 15, and the second rope 8 is connected to the cable(C) prepared on the side of the ending point(E), as shown in FIG. 16. As shown in FIG. 17, the second rope 8 is dragged by a traction motor 100 and the cable(C) connected to the second rope 8 is drawn onto the cable receiver 1. The cable(C) is laid on the cable receiver 1 after the removal of the cable(C) from the second rope 8, as shown in FIG. 18.

The group of FIGS. 19 to 24 shows a fourth process. As shown in FIG. 19, a cable receiver 1 to receive a cable(C) and a chute 2 with a slit are either attached on a wall or hung from a ceiling. As shown in FIG. 20, a second rope 8 is connected to a shuttle 3 to which a rope 4 is connected and the shuttle 3 is inserted into the chute 2 at a starting point(S). The second rope 8 is released from the shuttle 3 at an ending point(E) after the shuttle 3 reaches the ending point(E), as shown in FIG. 21, with the second rope left lying on the cable receiver 1. The second rope 8 is then connected to a cable(C) prepared on the side of the starting point(S), as shown in FIG. 22. The untied end of the second rope 8 is connected to a traction motor 100, which drags the second rope 8 and then the cable(C) connected to the second rope 8 onto the cable receiver 1.

As shown in FIG. 24, the cable(C) is laid on the cable receiver 1 after the removal of the cable(C) from the second rope 8.

In the case of the fourth process, as in the case of the second process, the connection of a second rope 8 and a cable(C) may be performed either before the second rope 8 is laid on a cable receiver 1 or after the second rope 8 is laid on a cable receiver 1. Or a second rope 8 and a cable(C) may be preparedly connected.

As set forth above, a cable can be easily and efficiently laid according to the present invention.

In the following are described devices and apparatus in accordance with the present invention.

A cable receiver is to receive a cable and comprises, for example, main frames 11 which constitute side parts and auxiliary frames 12 which constitute bottom parts, as shown in FIG. 25. A cable receiver may be a cable ladder type, an L or U shape type as shown in FIG. 26 or a wire rod bent, for example, like the one shown in FIG. 27. A plurality of such wire type cable receivers are distributed at certain intervals along cable routes.

These cable receivers are fixed securely either to a wall or to a ceiling.

FIG. 28-a shows a chute 2 formed cylindrical in which a shuttle 3 and a rope 4 go through. A chute 2 may take any shape as long as a shuttle 3 or a rope 4 can go through the chute 2. Such a chute 2 is usually made of either corrosion-resisting metal such as aluminum or synthetic resin produced by extrusion-molding, press-forming or the like. A chute 2 should have as long a length as possible but not necessarily be straight.

A chute 2 as shown in FIG. 28-a has a slit 20 in the longitudinal direction. The slit 20 is needed to move a shuttle 3 which has a tongue 31 with a connecting hole 32. The slit 20 is also needed to move a shuttle 3 when a connection rope to connect a cable is connected to the shuttle 3 or to move a shuttle 3 connected with the connection rope or the second rope when a second rope to drag a cable is connected to the shuttle 3.

As such, a chute 2 is used as a guide to send forth or drag back a cable laying kit comprising a shuttle 3 and a rope 4 and is also used to move a cable or a shuttle 3 with a second rope to drag a cable.

Openings 19 may be prepared at certain intervals besides a slit 20 on a chute 2, as are shown in FIG. 28-b, which allow a cable laying kit of a shuttle 3 and a rope 4 to go through. In such a chute 2, a cable laying kit is inserted into the chute 2 at one of the openings 19 and is taken out through another opening 19, giving an advantage of free selection of an insertion point of a cable.

Such a chute 2 may be prepared together with a cable receiver 1, or may be attached to a cable receiver before a cable laying operation or fixed to a wall or bolts separately.

A detailed description on a shuttle and a rope is given in the following.

A shuttle 3 is used to connect a cable or a second rope, as shown in FIG. 28-a. A shuttle can be cylindrical or partly conical. A cylindrical shuttle with a reduced end part is preferred since a shuttle of such a shape can move in a chute 2 more smoothly. A light weight shuttle is also preferred since a shuttle has to move both forward and backward in the chute 2.

A rope 4 ought to have hardness enough to push itself into a chute 2 and must be tough enough to bear the tention of drawing a cable. Such a rope may comprise a steel wire, a rope made of a plurality of finer steel wires, stick-shaped synthetic resin, synthetic resin fibers, an FRP(Fiber Reinforced Plastics) rope or the like. A rope 4 is preferred to be light weight.

A shuttle 3 and a rope 4 can be preparedly attached together or prepared separately to be connected together before the use.

A second rope, preferred to be light weight, is to be laid on a cable receiver before a cable is drawn and used to draw a cable. A second rope is especially useful in laying a relatively heavy cable.

BRIEF DESCRIPTION OF THE DRAWINGS

The features of the present invention that are believed to be novel are set forth in the appended claims. The invention, together with the objects and advantages, may best be understood by reference to the following description of the presently preferred embodiments together with the accompanying drawings in which:

FIGS. 57 to 101 are diagramatic side views showing a process to lay a cable utilizing a cable laying device comprising a chute attached to a frame.

DETAILED DESCRIPTION OF THE PREFERRED EMBODIMENT

Figure 1:
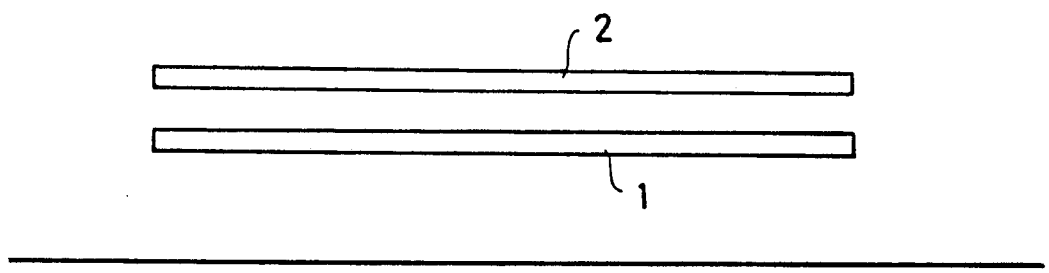
FIGS. 1 to 5 are diagramatic side views showing a process to lay a cable in accordance with the present invention.
Figure 2:
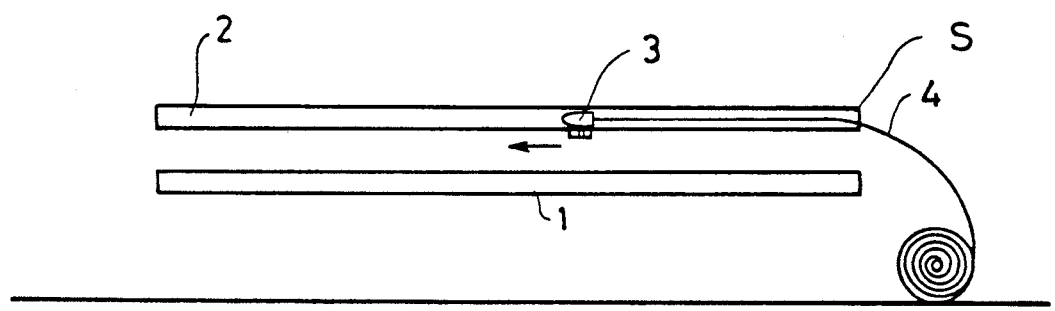
Figure 3:
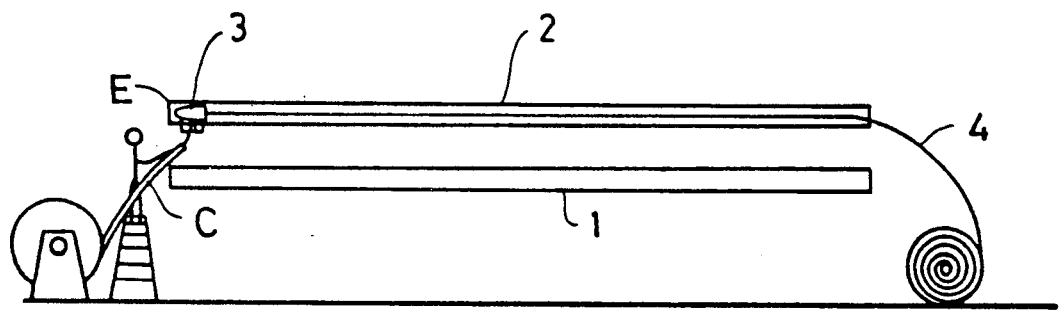
Figure 4:
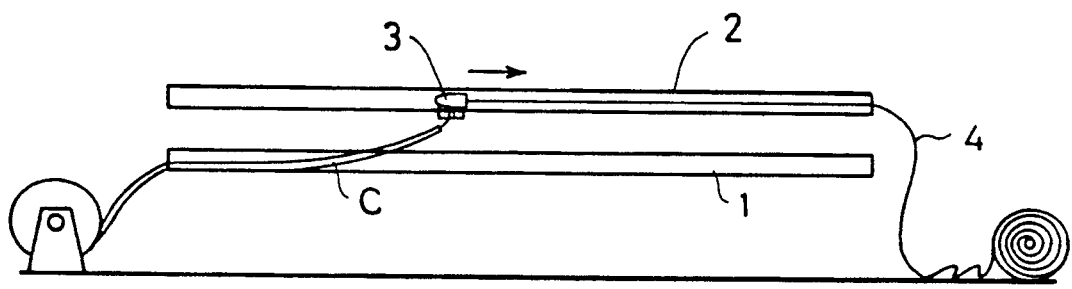
Figure 5:
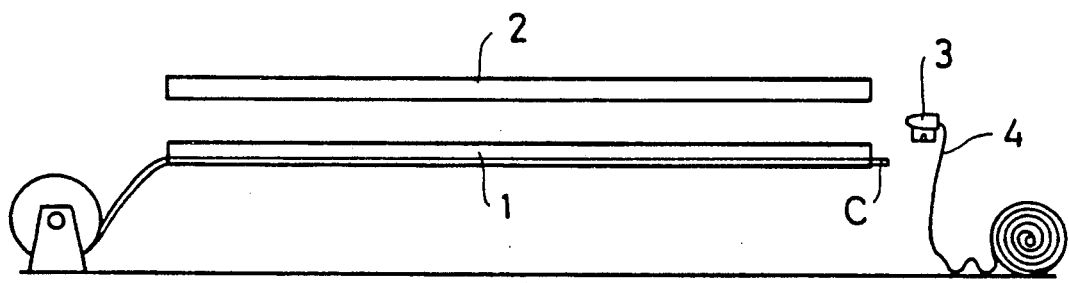
Figure 6:
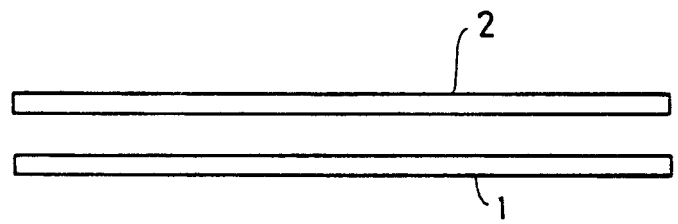
FIGS. 6 to 12 are diagramatic side views showing another process to lay a cable in accordance with the present invention.
Figure 7:
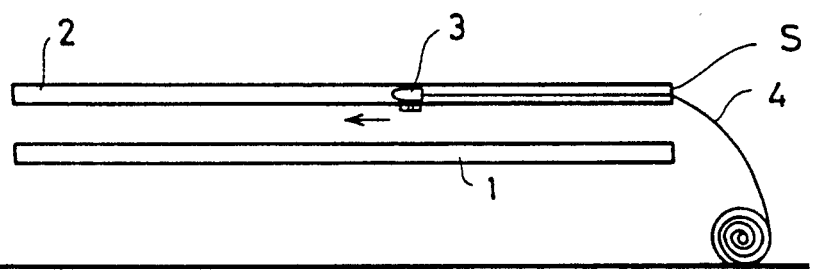
Figure 8:
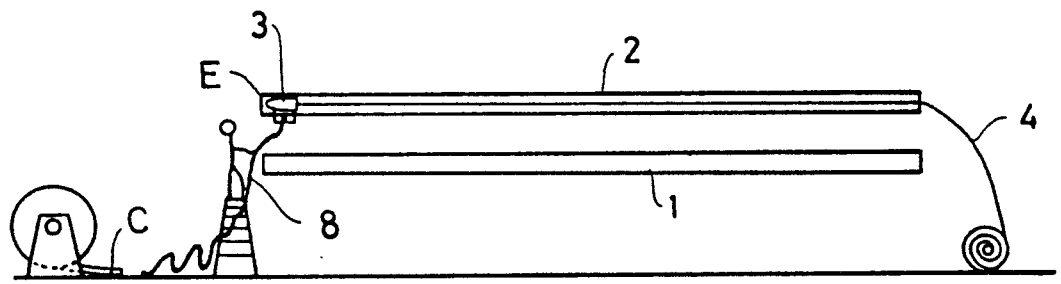
Figure 9:
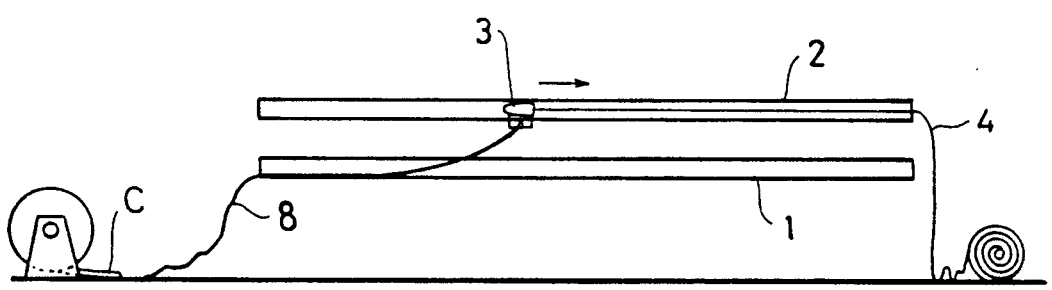
Figure 10:
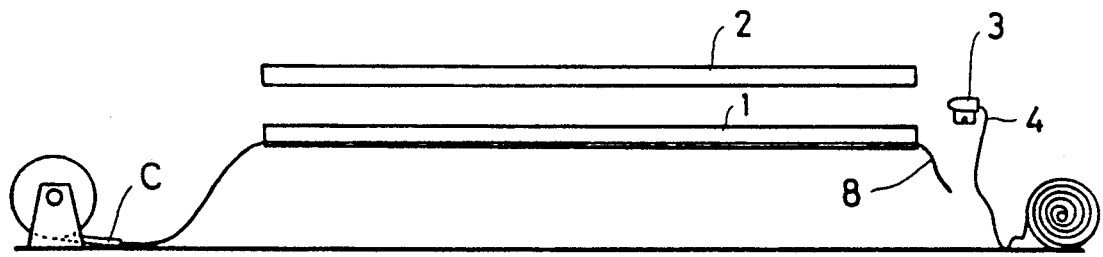
Figure 11:
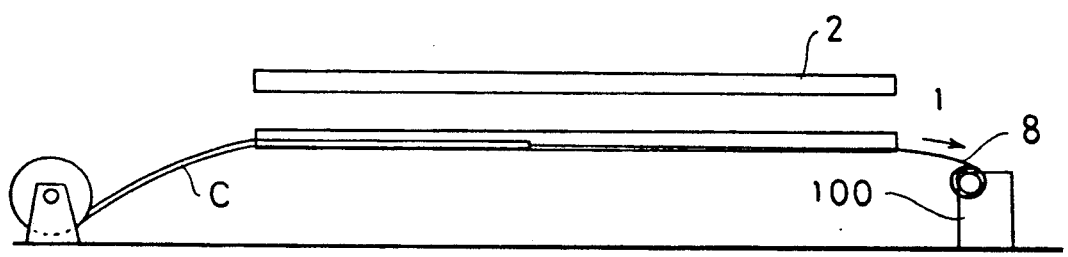
Figure 12:
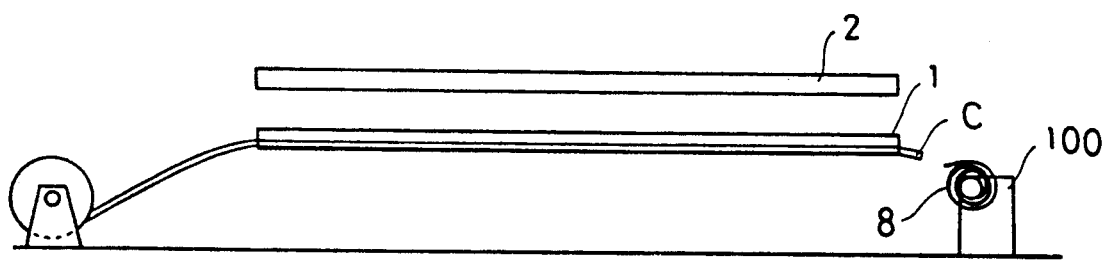
Figure 13:
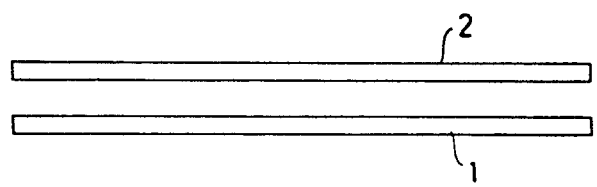
FIGS. 13 to 18 are diagramatic side views showing still another process to lay a cable in accordance with the present invention.
Figure 14:
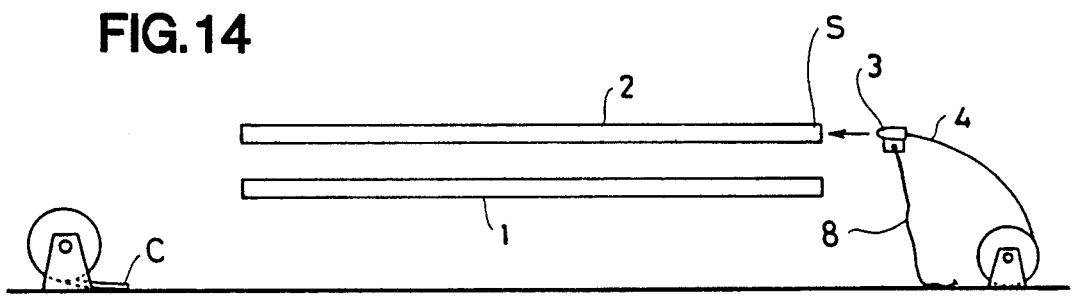
Figure 15:
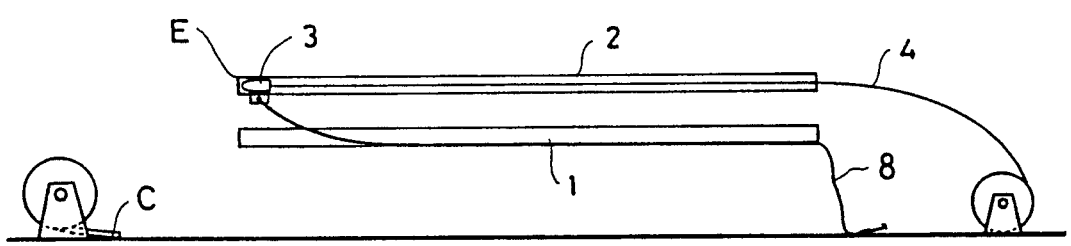
Figure 16:
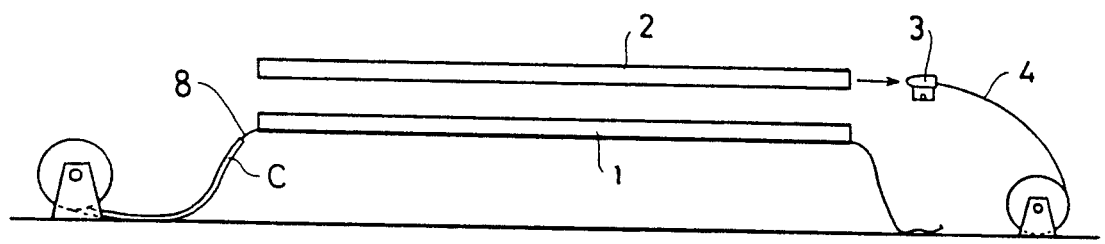
Figure 17:
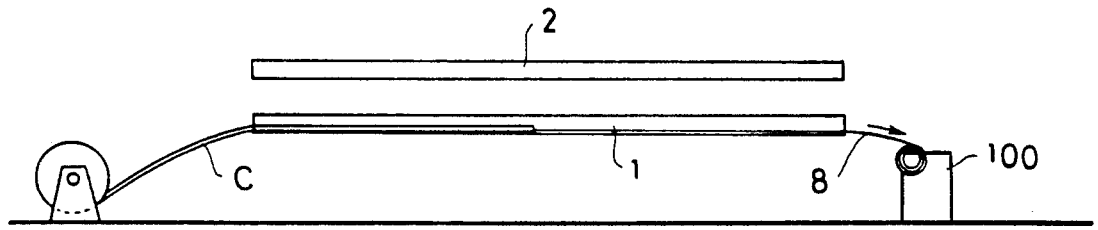
Figure 18:
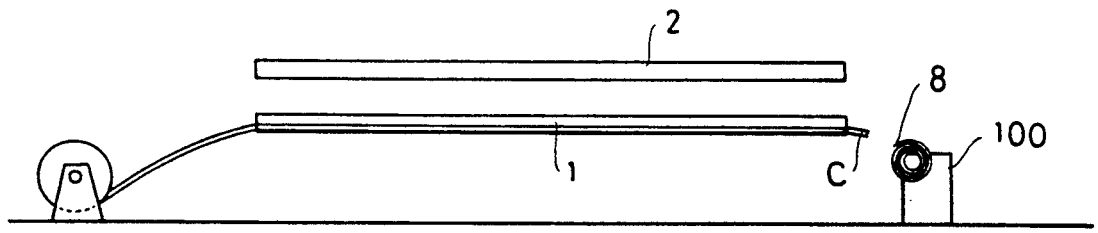
Figure 19:
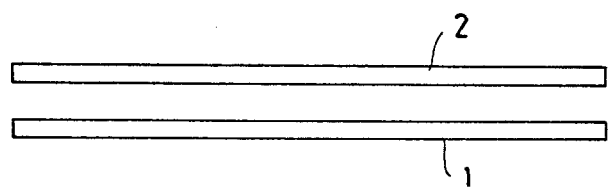
FIGS. 19 to 24 are diagramatic side views showing another process to lay a cable in accordance with the present invention.
Figure 20:
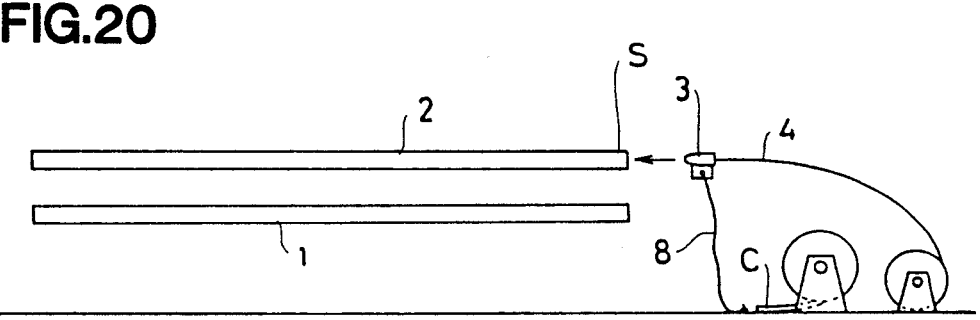
Figure 21:
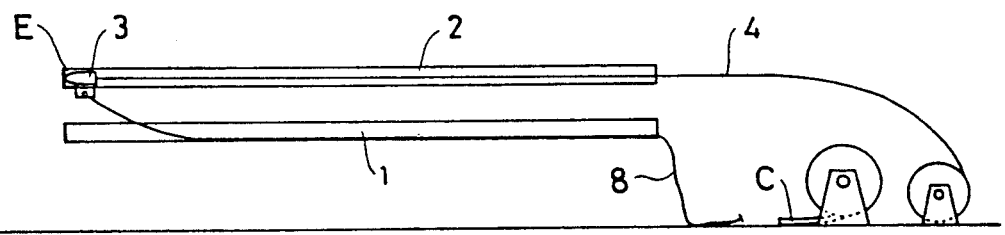
Figure 22:
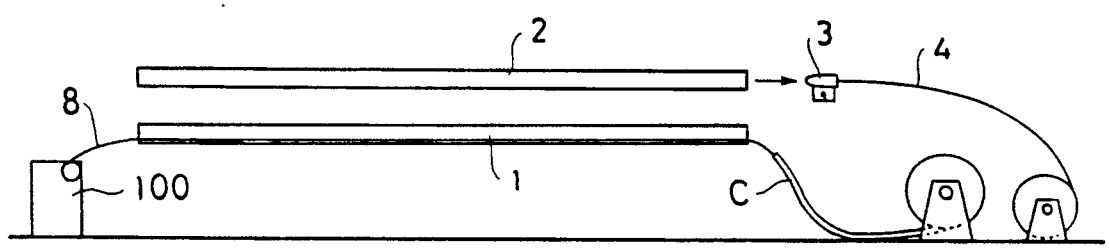
Figure 23:
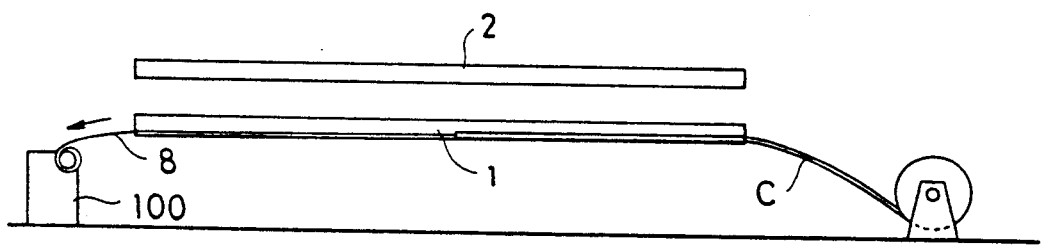
Figure 24:
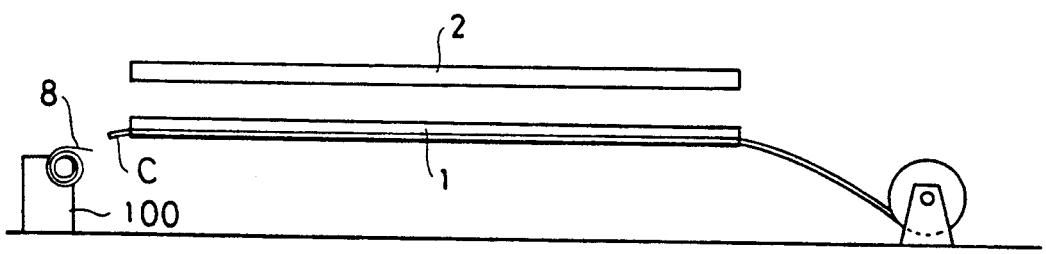
Figure 25:
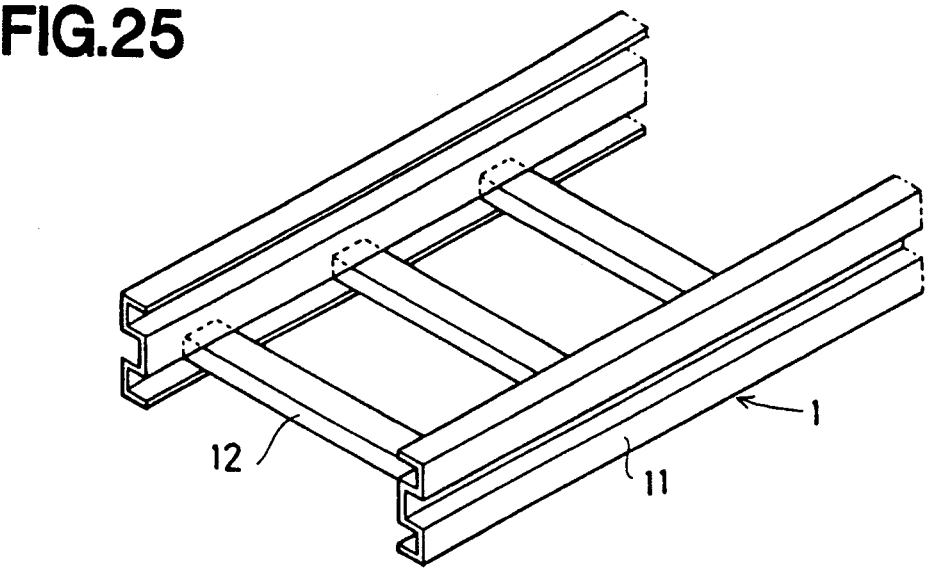
FIGS. 25 to 27 are perspective views showing cable receivers of embodiments.
Figure 26:
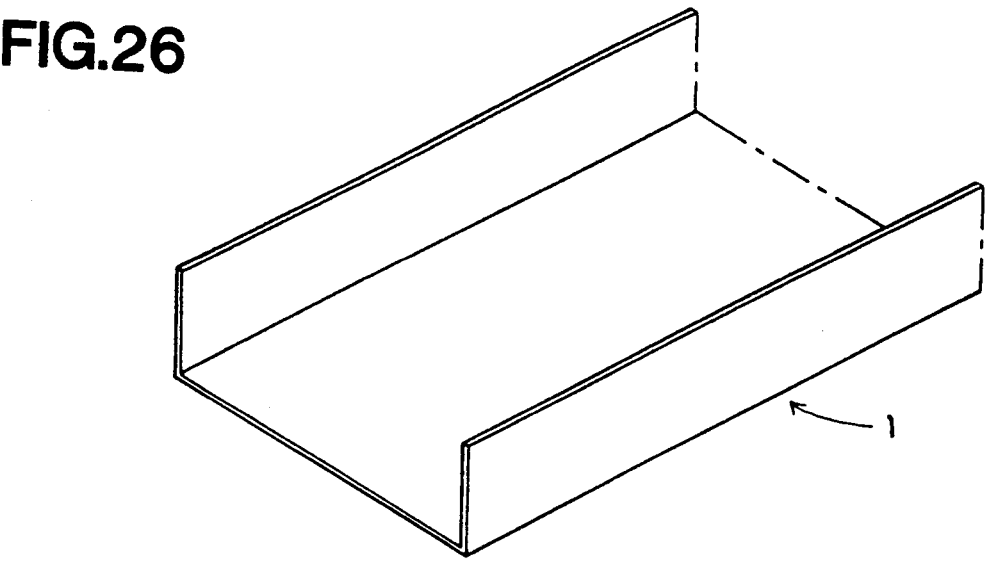
Figure 27:
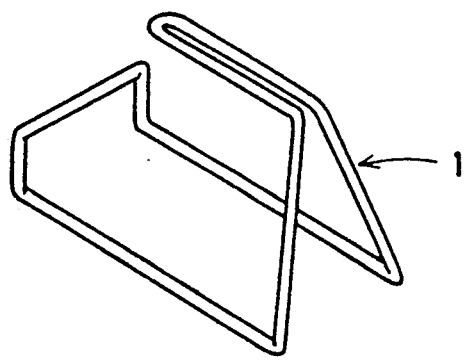
Figures 1, 28A:
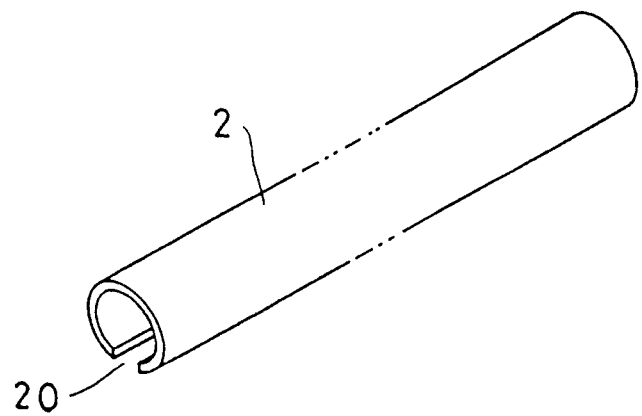
Figures 2, 28A:
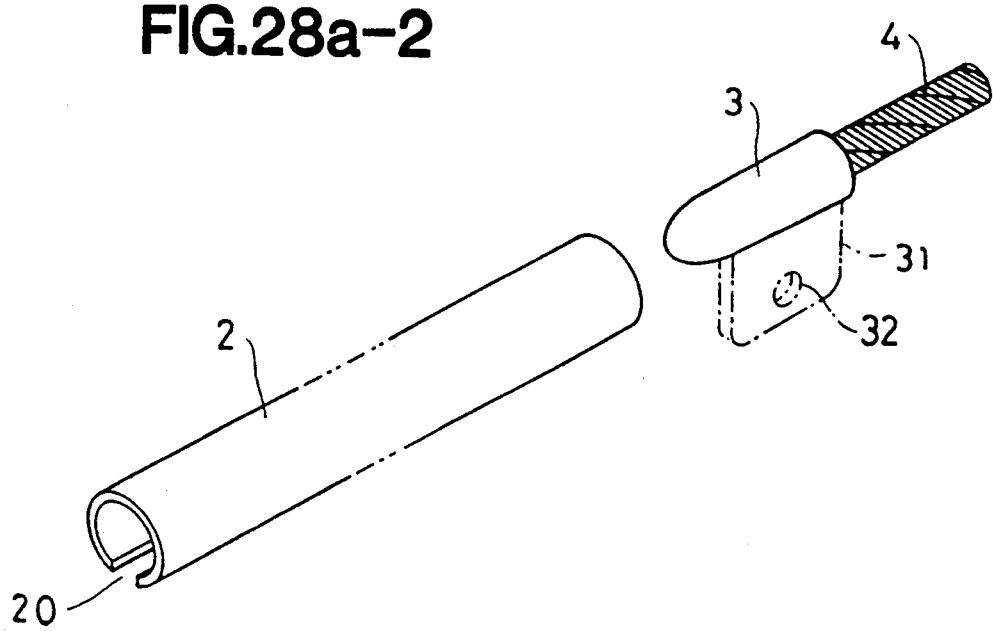
Figure 28B:
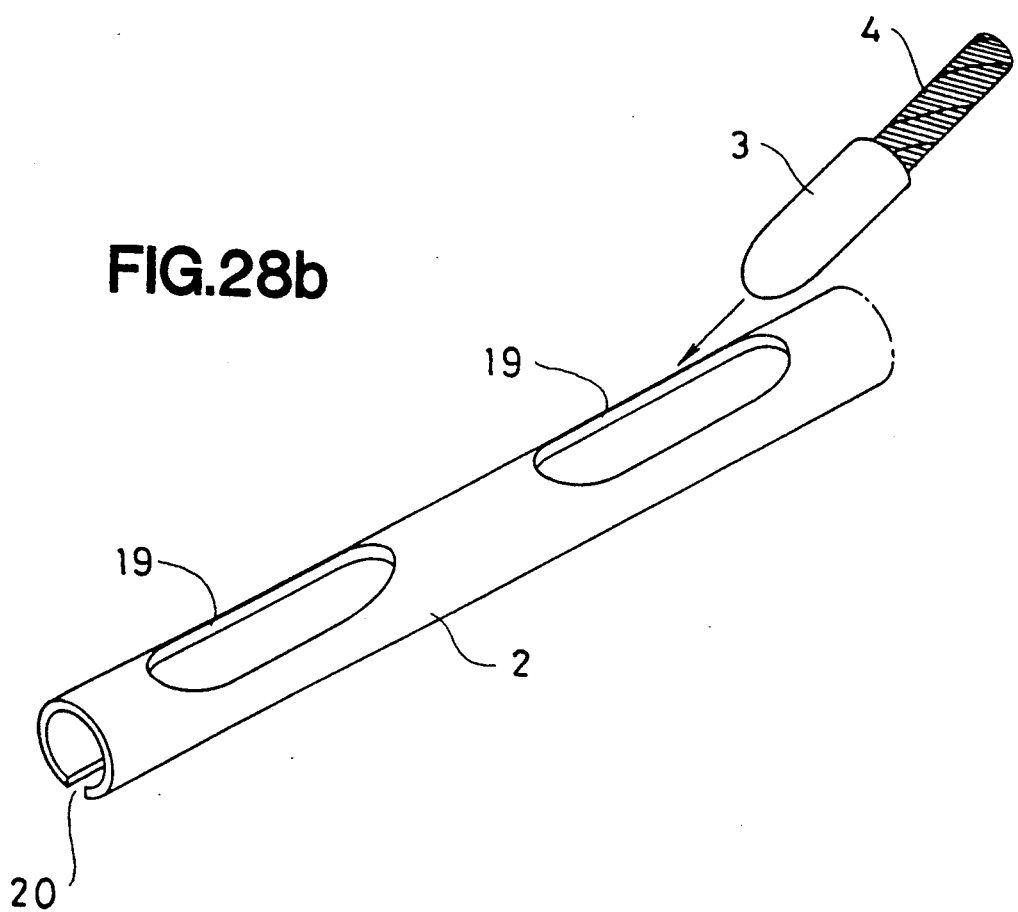
FIGS. 28-a and 28-b are perspective views showing chutes and cable laying kits.
Figure 29:
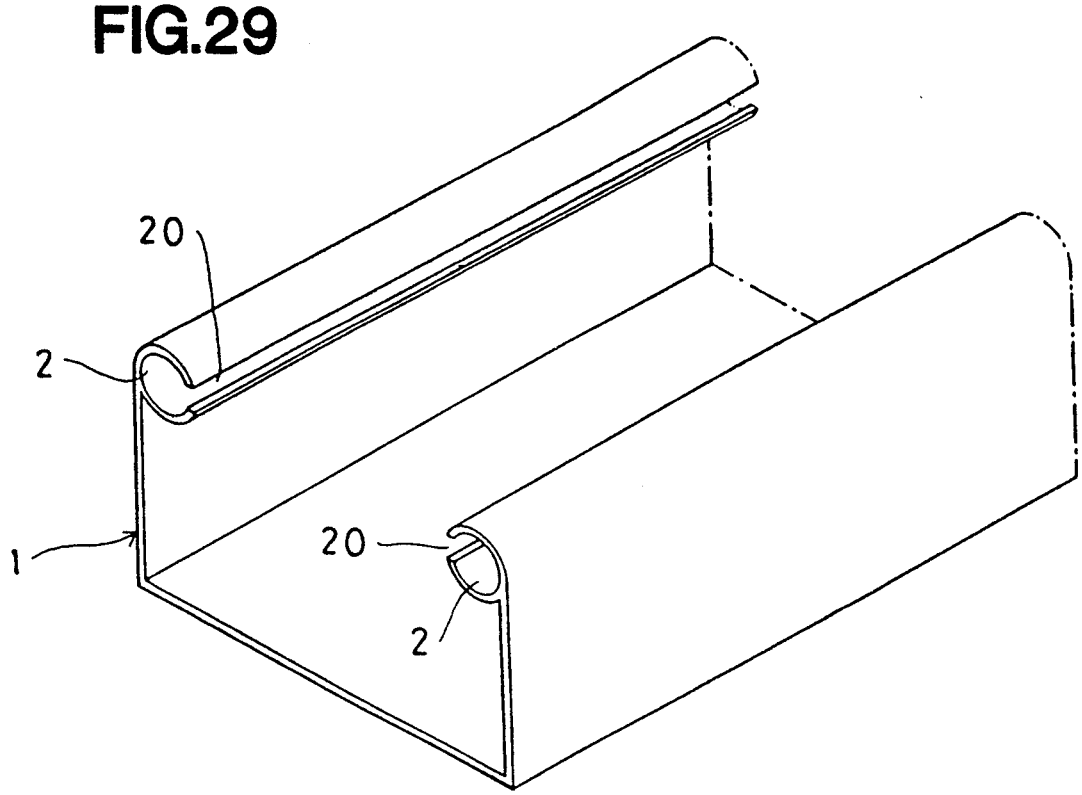
FIGS. 29 to 31(a-b) are perspective views showing other cable receivers incorporating a chute or chutes.

As illustrated in the drawings, preferred embodiments of the present invention are described in detail hereafter.

EMBODIMENT 1

FIGS. 29 to 51 show the first embodiment.

Cable receivers 1 incorporating a chute 2 are shown in FIGS. 29 to 35.

Figure 30:
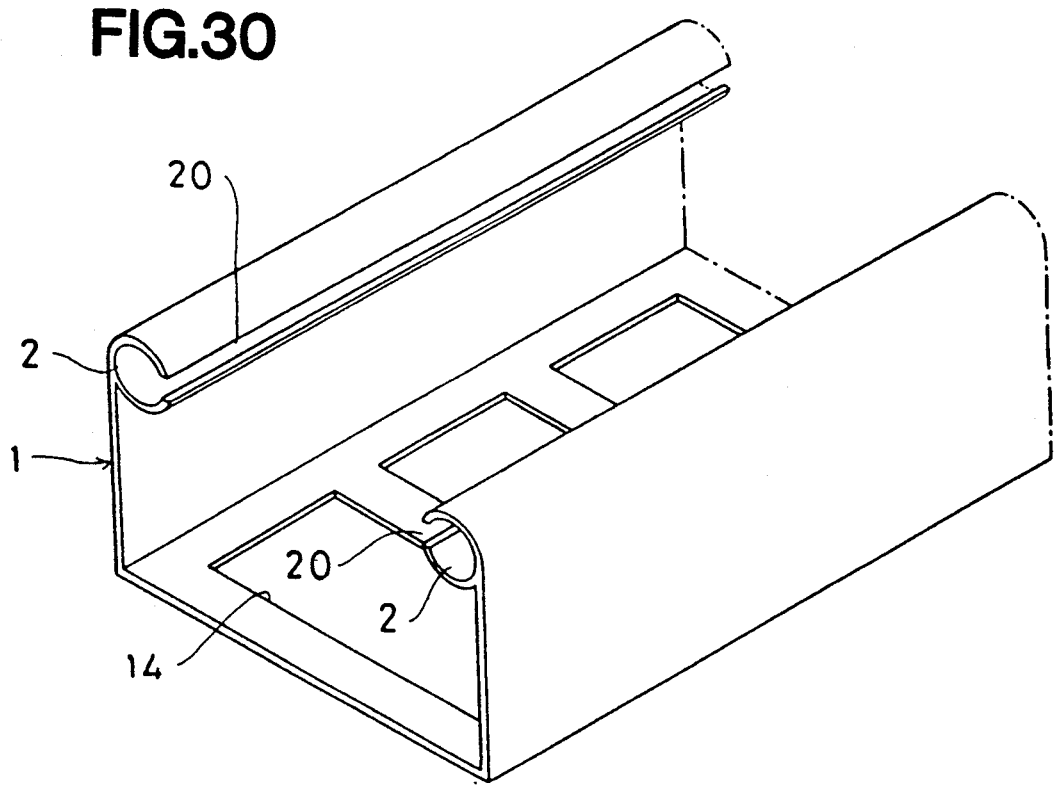
Figure 31A:
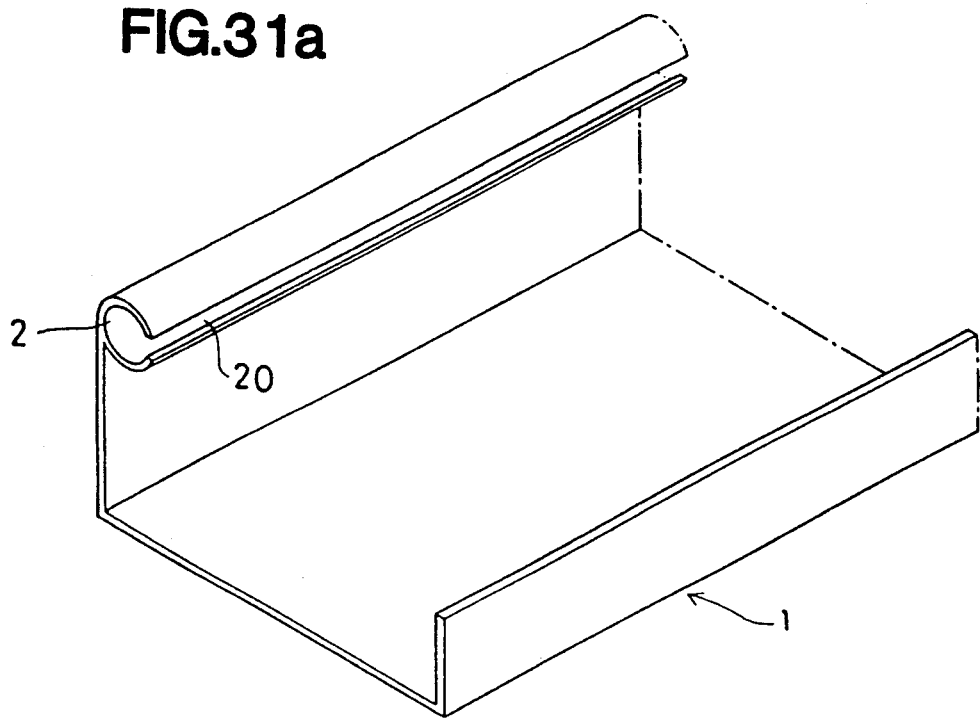
Figure 31B:
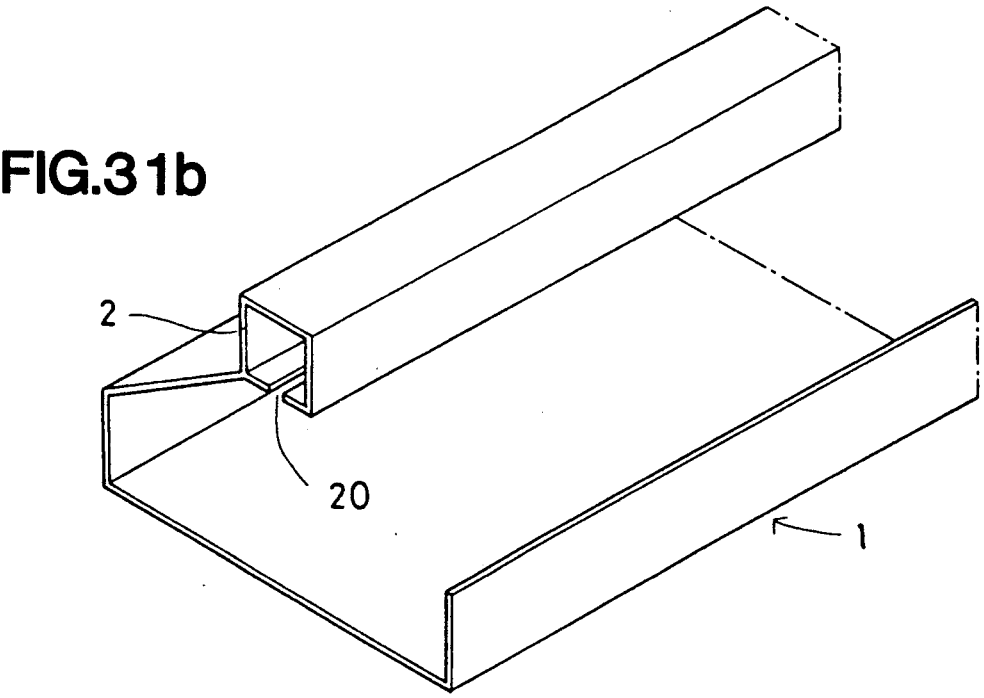
Figure 35:
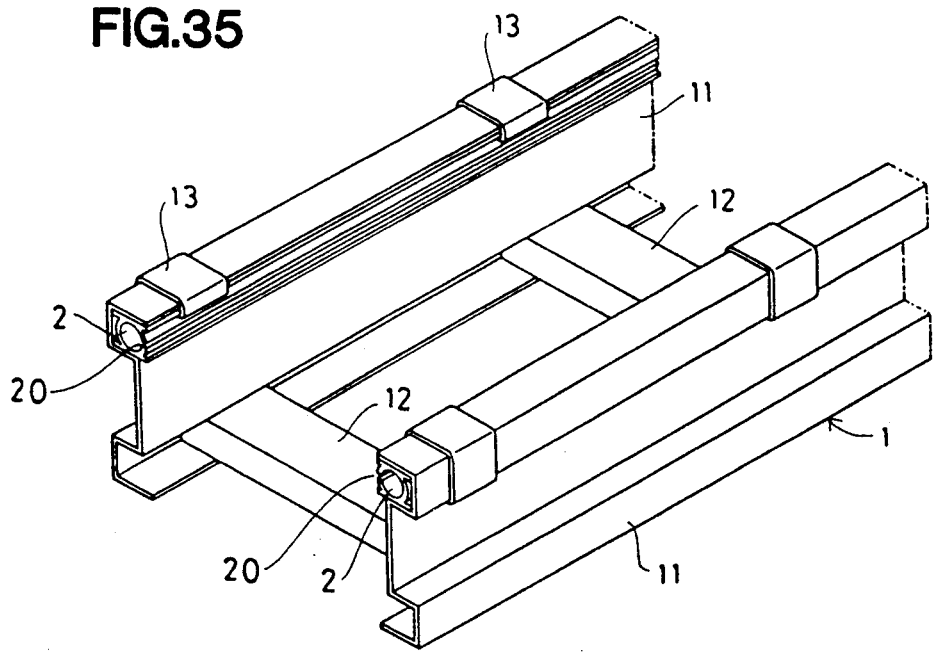
FIG. 35 is a perspective view showing another cable receiver incorporating chutes.

Cable receivers 1 as shown in FIGS. 29 to 34 incorporate wall parts, a bottom part and a chute or chutes. A cable receiver 1 as shown in FIG. 35 comprises main frames 11, auxiliary frames 12 and chutes attached with fasteners 13. These cable receivers 1 can be formed of metal or synthetic resin by press forming or extrusion. The side walls of cable receivers 1 are both treated to form a U shape or the like to possess a pair of chutes at the tops of the side walls, as shown in FIGS. 29 and 32 to 34. A cable receiver 1 as shown in FIG. 30 has openings 14 at the bottom. A cable receiver 1 is treated at the top part of a side wall to possess a chute 2 at the top of a side wall as shown in FIG. 31-a. Another cable receiver 1 is treated at the top part of a side wall to possess a chute 2 with a slit 20 in the bottom, as shown in FIG. 31-b. It is economical to produce such a cable receiver 1 preparedly incorporating a chute 2 or chutes 2 since both are formed together in a single process.

Figure 32:
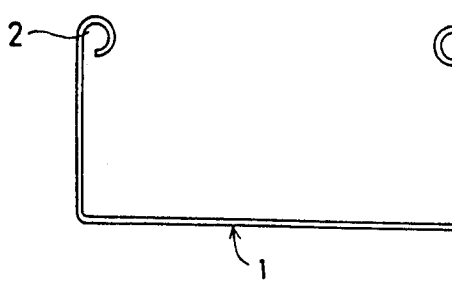
FIGS. 32 to 34 are front views showing cable receivers incorporating chutes.
Figure 33:
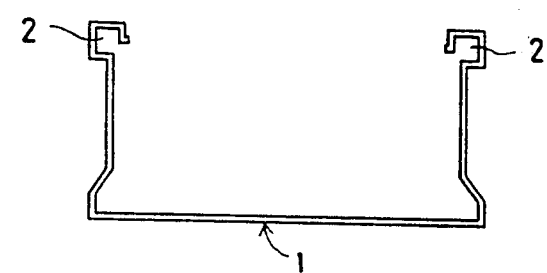
Figure 34:
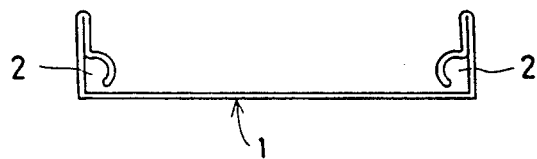
Figure 38:
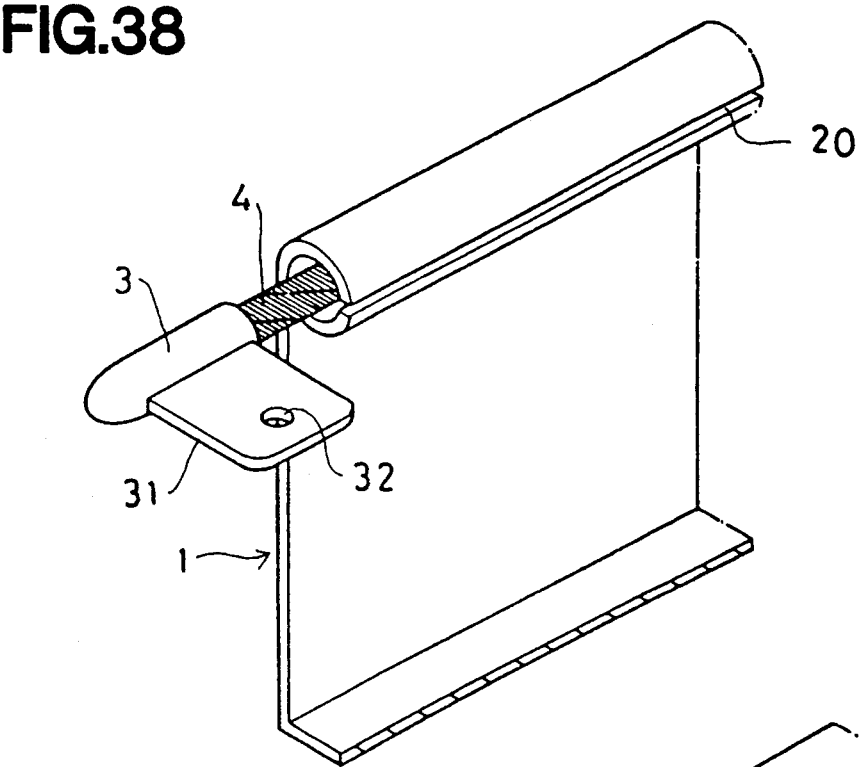
FIGS. 38 and 39 are perspective views showing cable laying kits as inserted in a cable receiver.
Figure 39:
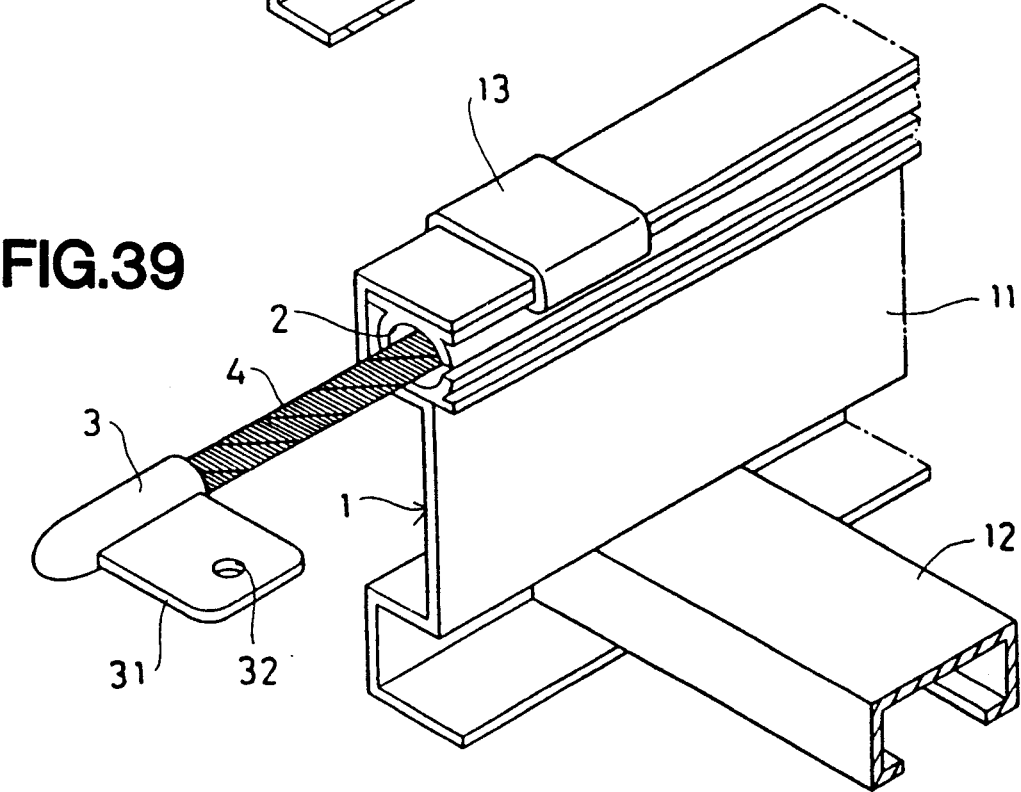

A shuttle 3 and a rope 4 can go through a chute 2 as shown in FIGS. 38 and 39. A chute 2 may be circular in cross section as shown in FIG. 32 or rectangular in cross section as shown in FIG. 33.

A chute 2 comprises a slit 20 in the longitudinal direction. A slit 20 is formed on the cable receiving side of a cable receiver.

A cable receiver 1 usually has a length of several meters and in case it is necessary to extend the cable route, a plurality of cable receivers 1 are connected in succession. Cable receivers 1 may be connected with couplers, bolts and nuts, or the like. Cable receivers 1 need be so connected that a shuttle 3 and a rope 4 can travel through these cable receivers 1.

Figure 36A:
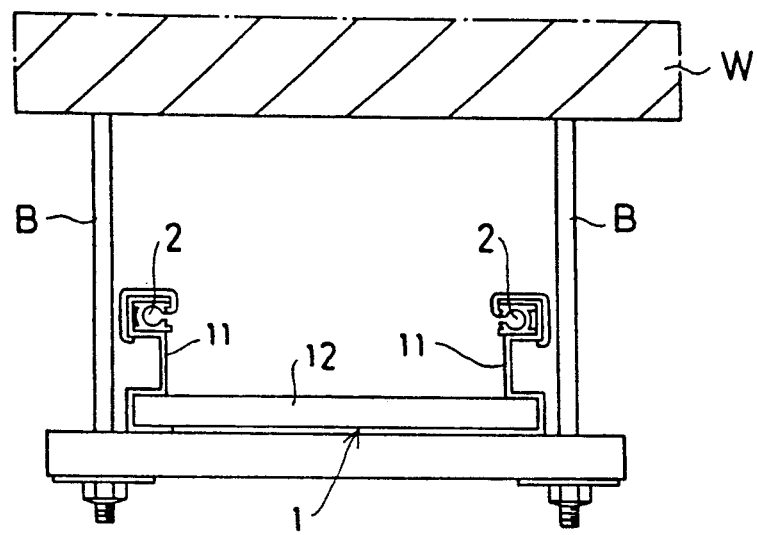
FIGS. 36-a and 36-b and 37 are sectional views showing cable receivers as installed.
Figure 36B:
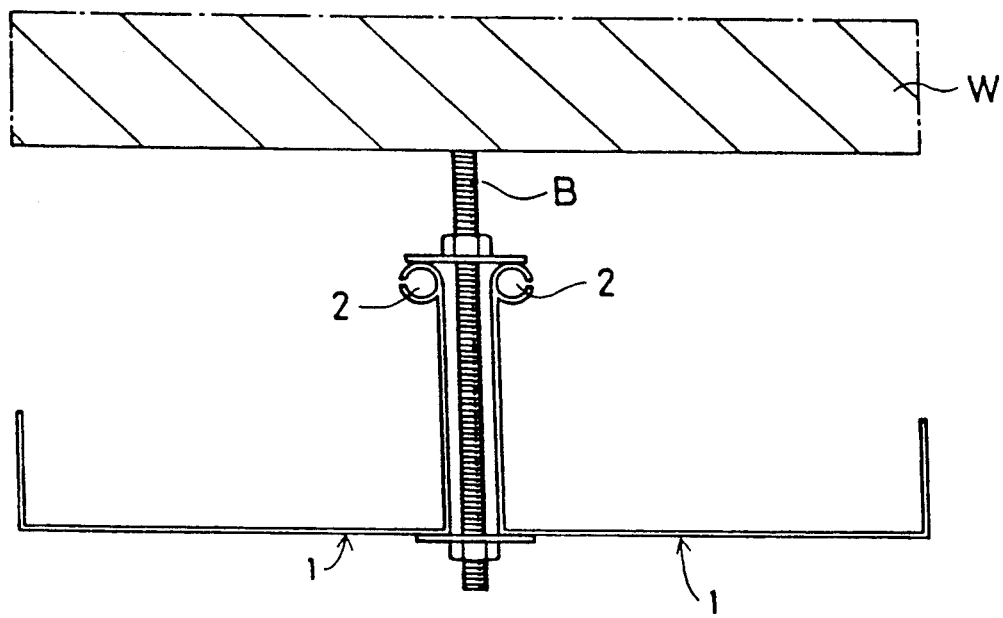
Figure 37:
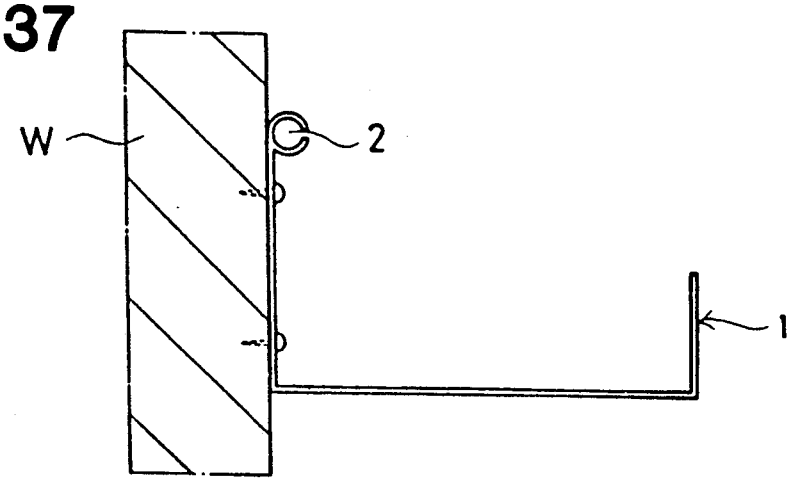

Cable receivers 1 are to be attached to or hung from a ceiling(W) with bolts(B) as shown in FIGS. 36-a and 36-bor to be directly attached to a wall(W) as shown in FIG. 37.

As shown in FIGS. 38 and 39, a shuttle 3 is shaped bullet-like so as to be easily sent through a chute 2.

Figure 40:
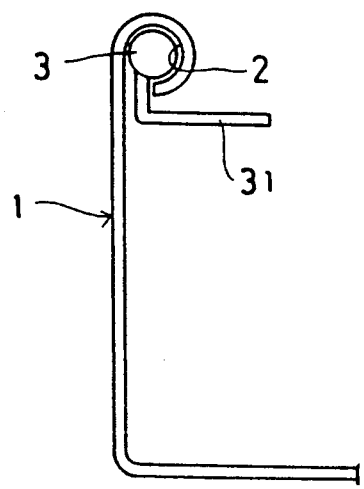
FIG. 40 is a partial front view showing a cable laying kit as inserted in a chute of an embodiment.
Figure 41:
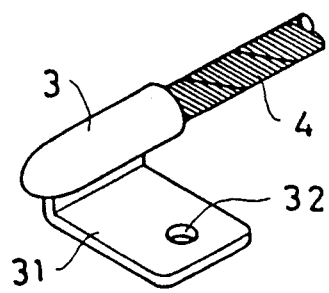
FIG. 41 is a perspective view showing a cable laying kit as shown in FIG. 40.

A shuttle 3 as shown in FIGS. 38 and 39 has a projecting tongue 31. A tongue 31 has a connection hole 32 to be used to connect a connecting rope or a second rope to the tongue 31. A tongue 31 moves in a chute 2 as it projects from a slit 20. A tongue 31 should take a shape to best fit the shape of a corresponding slit 20. A tongue 31, for example, is to be bent like the ones as shown in FIGS. 40 and 41 when a chute 2 is shaped as shown in FIG. 32.

Figure 42:
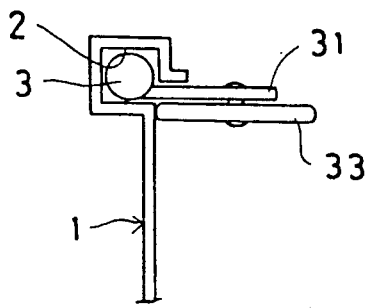
FIG. 42 is a partial front view showing a cable laying kit as inserted in a chute of an embodiment.
Figure 43:
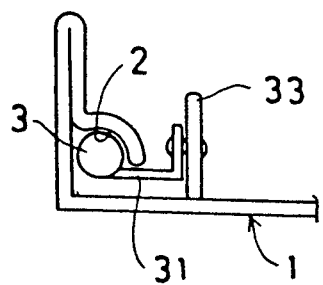
FIG. 43 is a partial front view showing a cable laying kit as inserted in a chute of an embodiment.
Figure 44:
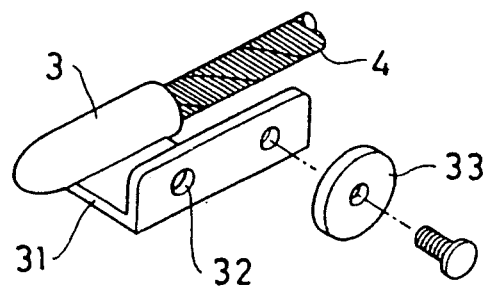
FIG. 44 is a perspective view showing a disassembled calbe laying kit as shown in FIG. 43.
Figure 45:
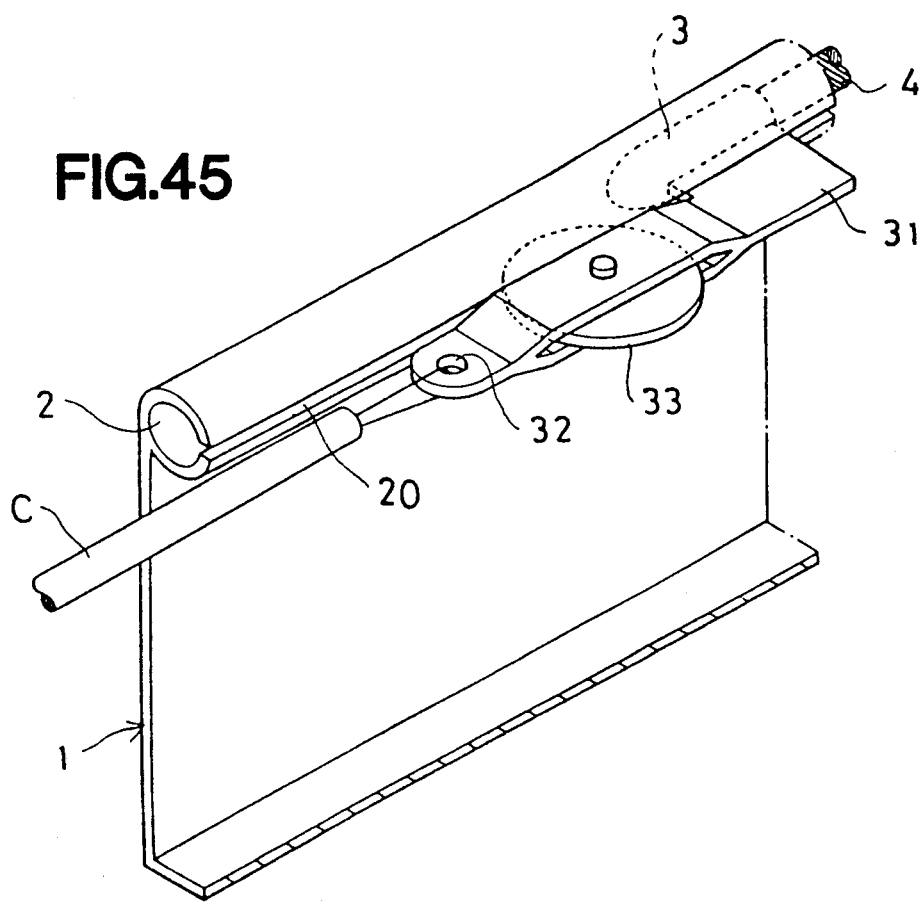
FIG. 45 is a perspective view showing another cable laying kit as inserted in a chute of an embodiment.

A tongue 31 may be provided with a roller 33 which rolls on a side or the bottom wall of a cable receiver 1, as shown in FIGS. 42 and 43, in order to smoothly move a shuttle 3 in a chute 2. FIG. 44 shows a disassembled shuttle 3 with a tongue 31 having a roller 33. A roller 33 may be provided to run in a slit 20 as shown in FIG. 45, which enables smooth drawing of a cable onto a cable receiver 1.

With the use of such a cable laying device as set forth above, a cable laying operation is performed as shown in FIGS. 46 to 50.

Figure 46:
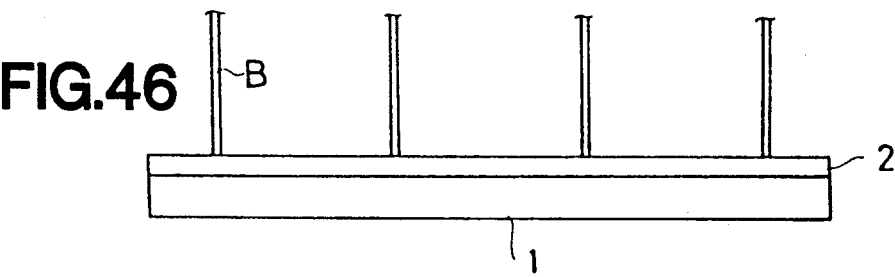
FIGS. 46 to 50 are diagramatic side views showing a process to lay a cable in accordance with the present invention, wherein a chute incorporates a laying kit in a cable receiver.
Figure 47:
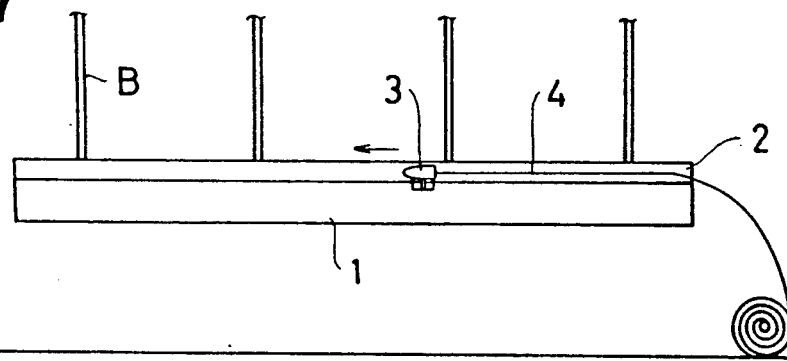
Figure 48:
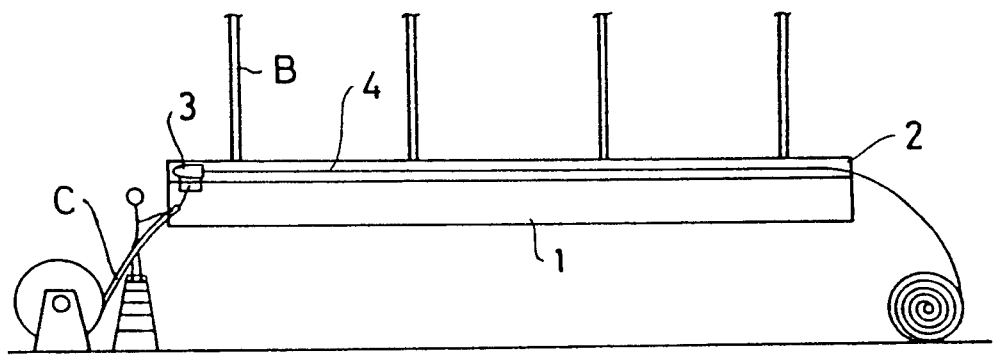
Figure 49:
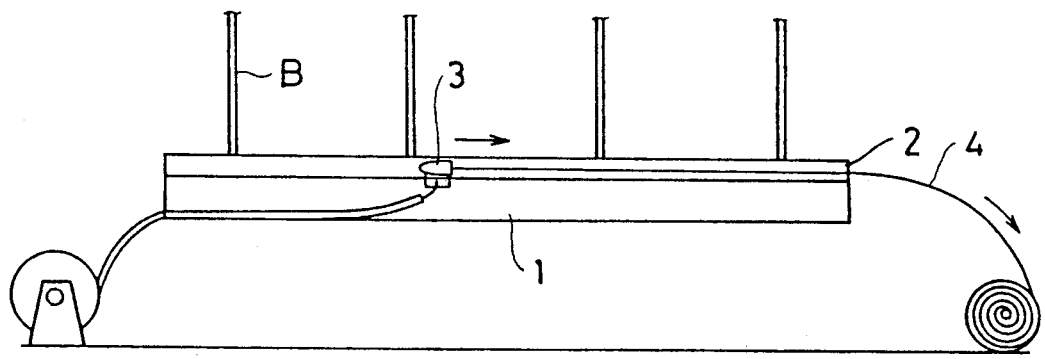
Figure 50:
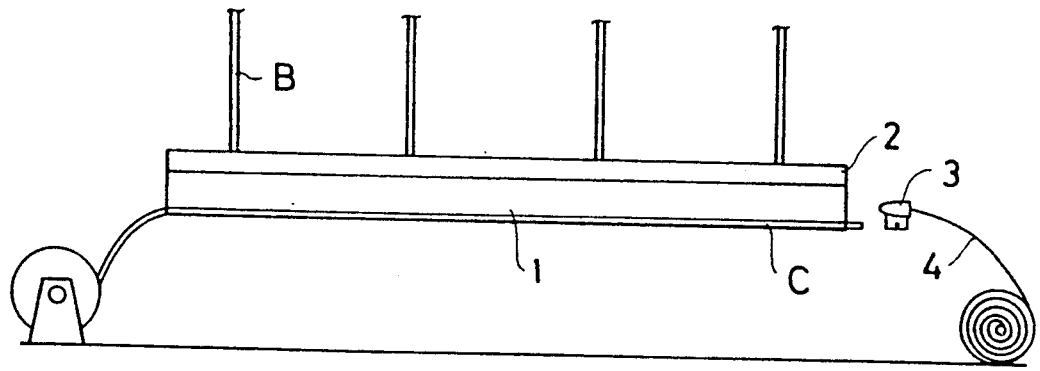

A cable receiver 1 and a chute 2 are provided as shown in FIG. 46, and a shuttle 3 and a rope 4 are provided in the chute 2 as shown in FIG. 47. The rope 4 should be hard enough to push the shuttle 3 and itself in the chute 2. A cable(C) is connected to the shuttle 3 by means of a connecting rope or the like as shown in FIG. 48. The shuttle 3 is then drawn back and the cable(C) is drawn together as shown in FIG. 49. The cable(C) is laid on the cable receiver 1 when it is released from the shuttle 3.

The above described cable laying device enables cable laying work without disturbance by the existance of bolts(B). Furthermore, such a cable receiver 1 and a chute 2 are preparedly incorporated, which enables an efficient and easy cable laying operation.

Figure 51:
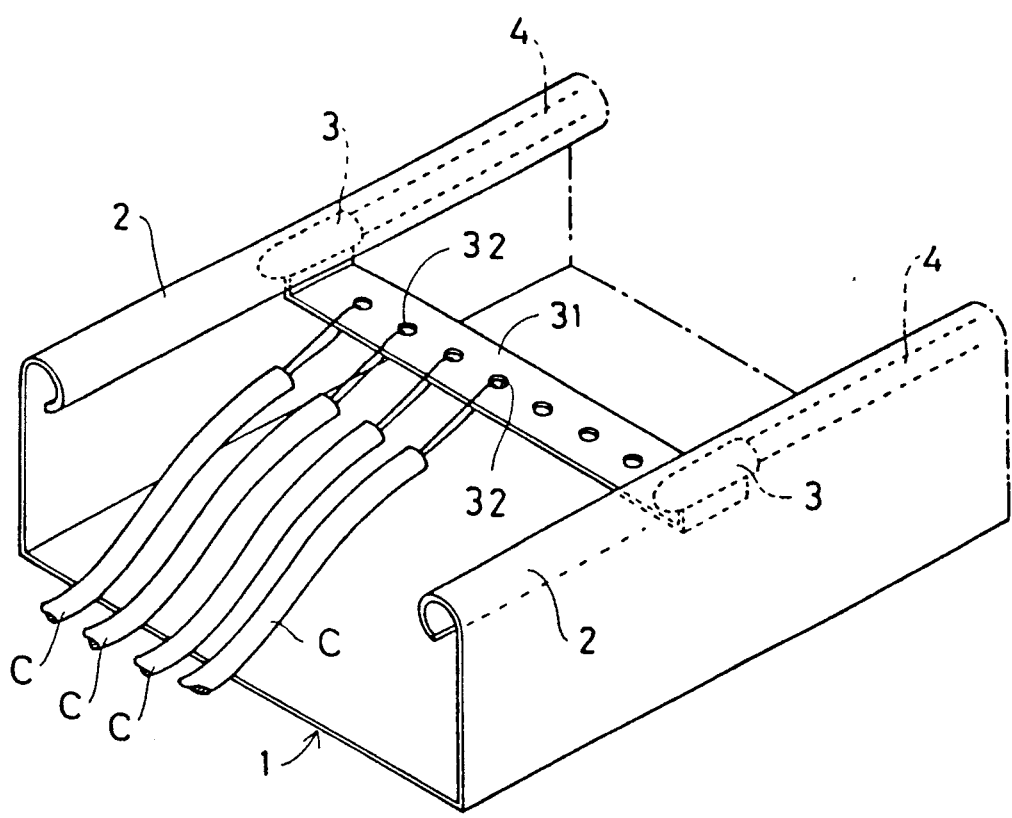
FIG. 51 is a perspective view showing a cable laying device to lay a plurality of cables at a time.

In case a pair of shuttles 3 with a tongue 31 as shown in FIG. 51 are used, a pair of chutes 2 are provided to both the side walls of a cable receiver 1. A pair of shuttles 3 inserted in the chutes 2 have a common tongue 31 bridged between both the shuttles 3. The tongue 31 has a plurality of connecting holes 32. A plurality of cables(C) are connected to the connecting holes 32 by means of connecting ropes. As the ropes 4 in the chutes 2 are dragged, cables(C) are also dragged.

EMBODIMENT 2

FIGS. 52 to 66 show the second embodiment.

Figure 53:
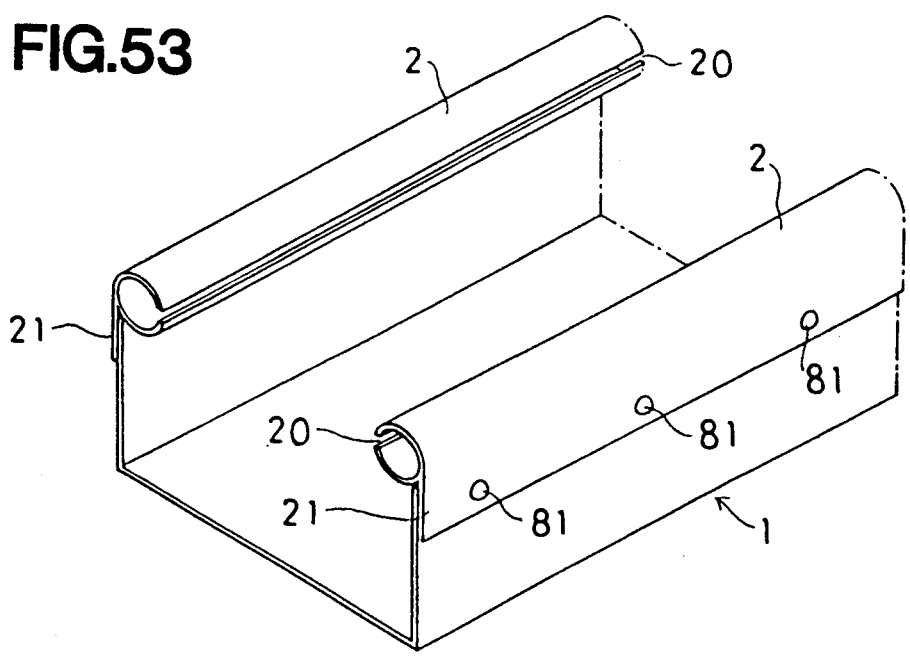
Figure 54:
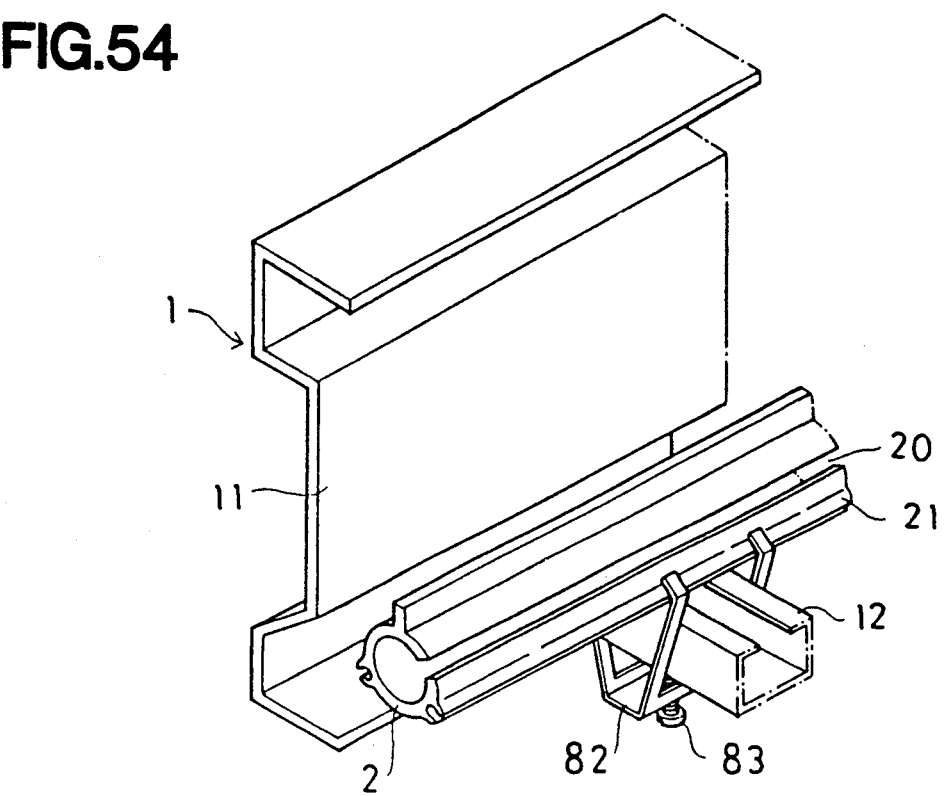
FIGS. 54 and 55 are perspective views showing cable laying devices with an attachment portion to be attached to a cable receiver.
Figure 55:
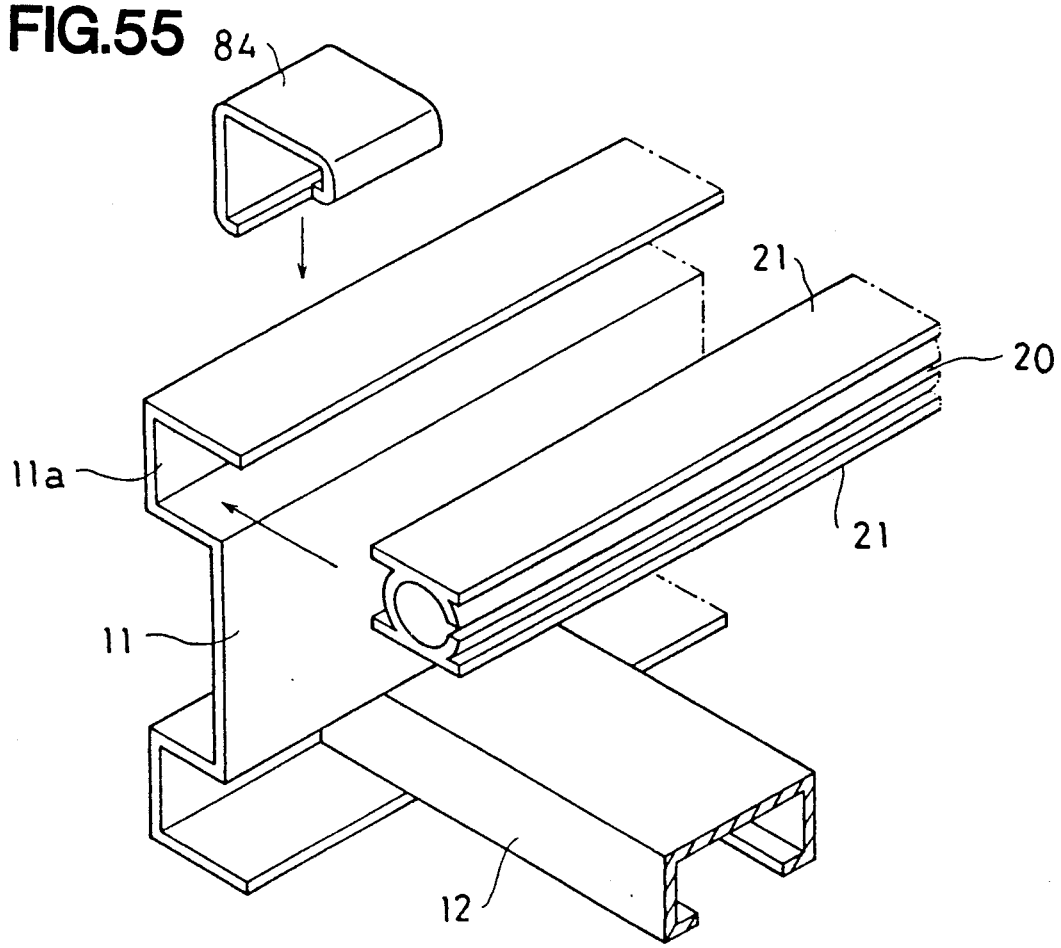
Figure 57:
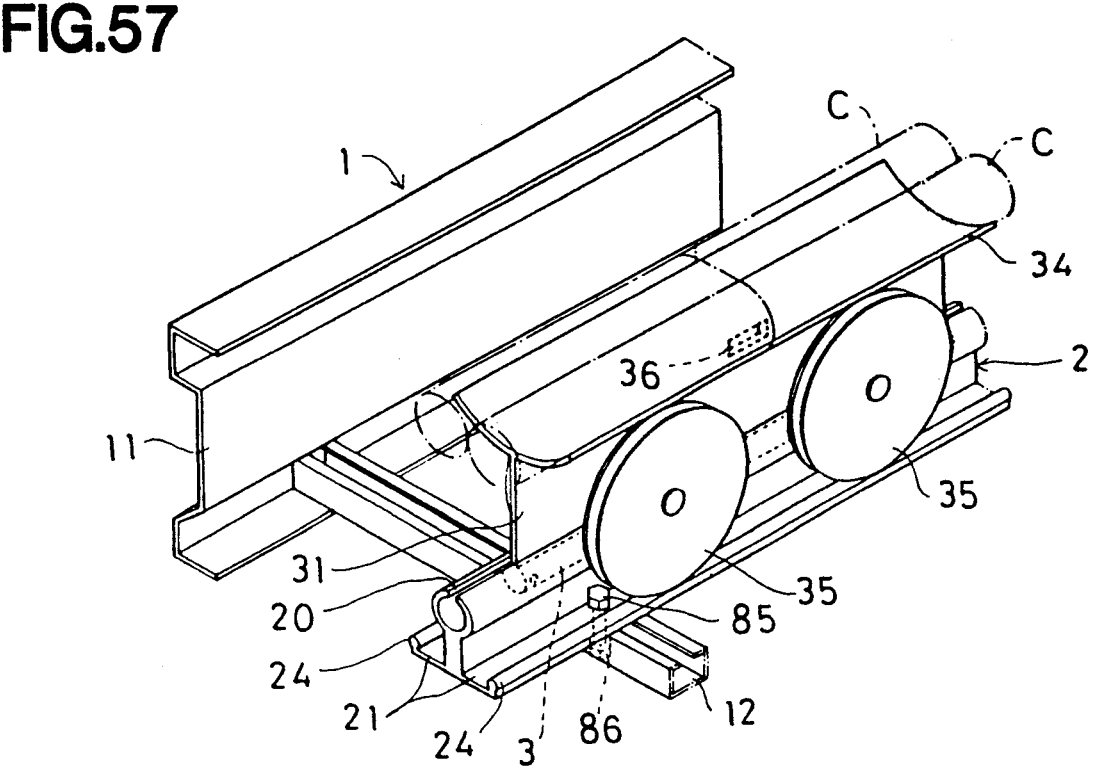
FIGS. 57 and 58 are perspective views showing other cable laying devices.
Figure 58:
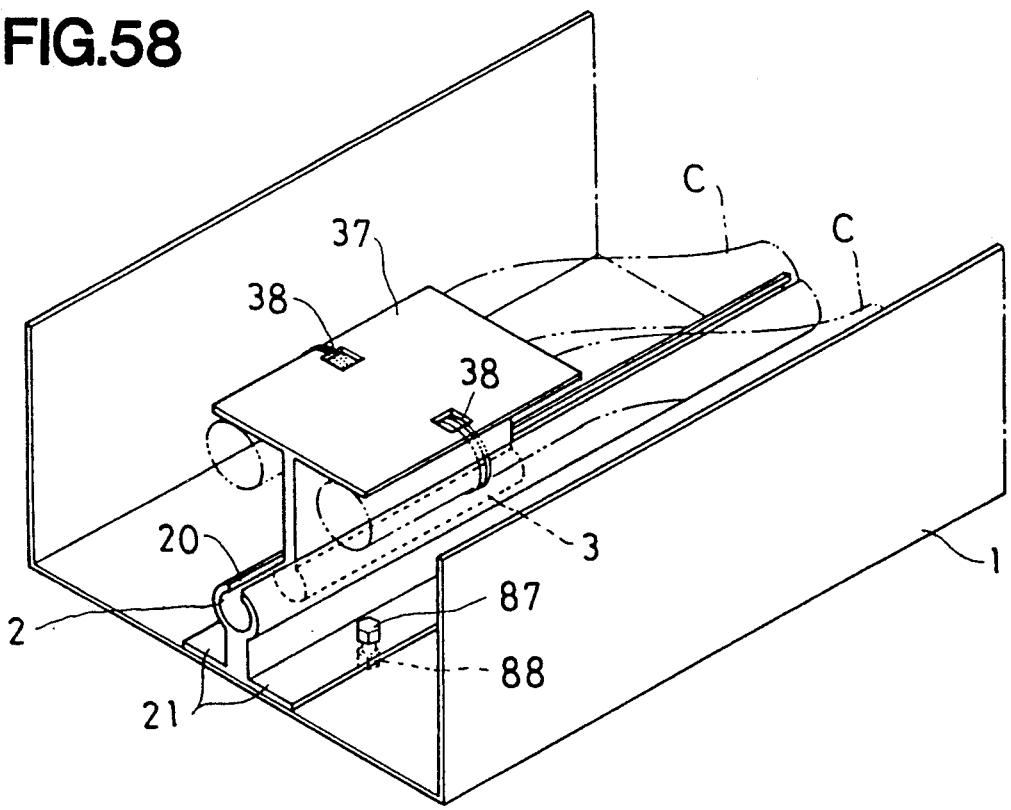

A chute 2 used in this cable laying device has attachment portions 21 to be attached to the side walls or the bottom of a cable receiver 1 as shown in FIGS. 53 and 58, or to be attached to the main frame 11 and/or the auxiliary frames 12 of a cable receiver 1 as shown in FIGS. 54, 55 and 57.

Figure 52:
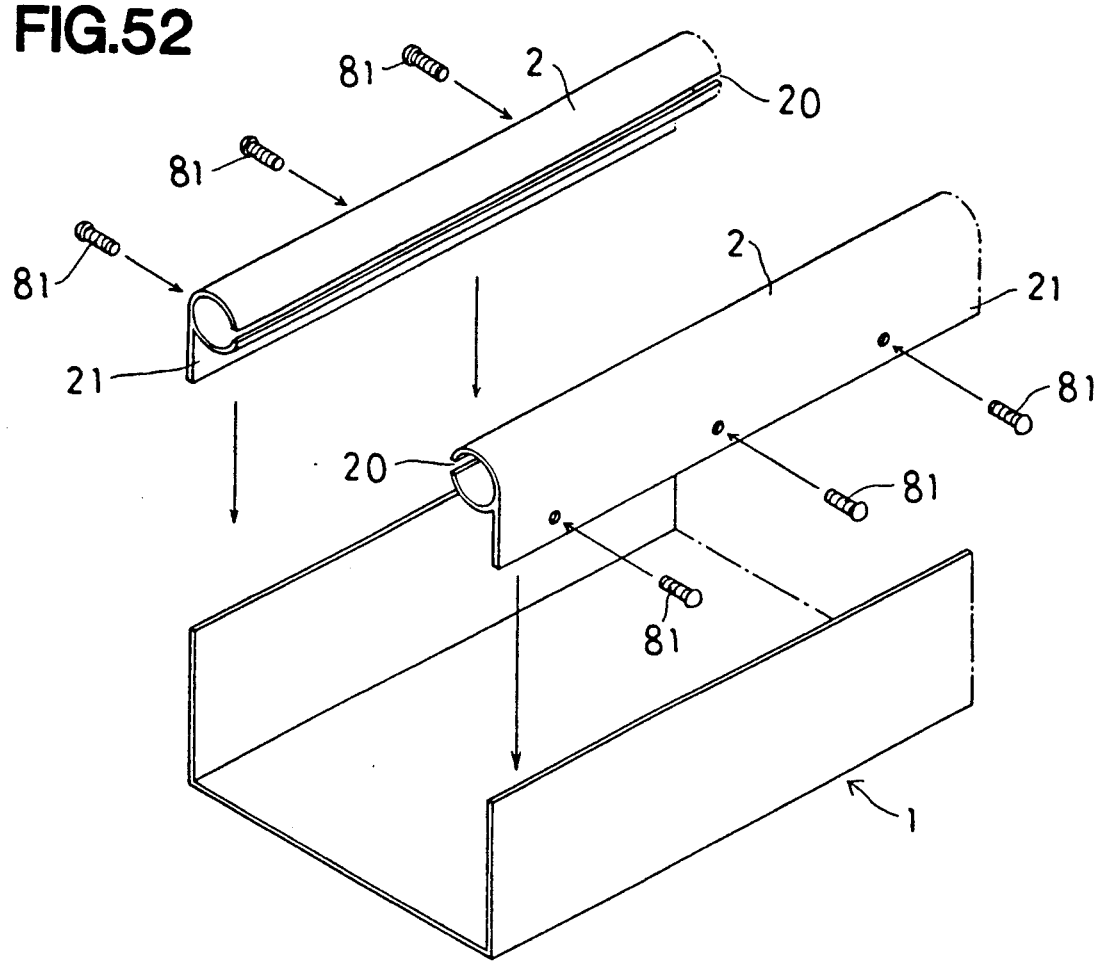
FIGS. 52 and 53 are perspective views showing an assembly of a cable laying device with attachment plates to be attached to a cable receiver.

A plate shape attachment portion 21 is formed on a chute 2 extending in the longitudinal direction of the chute 2 as shown in FIG. 52. The chute 2 can be attached to each side wall of the cable receiver 1 by means of screws 81 as shown in FIG. 53.

Attachment portions 21 are ribs extending in the longitudinal direction as shown in FIG. 54. The chute can be attached to the auxiliary frame 12 of the cable receiver 1 by means of a fastener 82 having hooking portions to the ribs and a bolt 83 is used to securely fasten the fastener 82.

Plate shape attachments 21 are provided to the top and the bottom of the chute 2. The chute 2 is inserted and tightened in a recess 11a formed in the main frame 11 as shown in FIG. 55.

Besides screws 81 or the like, bolts, nuts, binding wires or the like may be utilized to attach the chute 2 to the cable receiver 1.

The chute 2 can be removed from the cable receiver 1 and be used in another cable receiver 1 after an operation, which helps reduce work cost.

Figure 56:
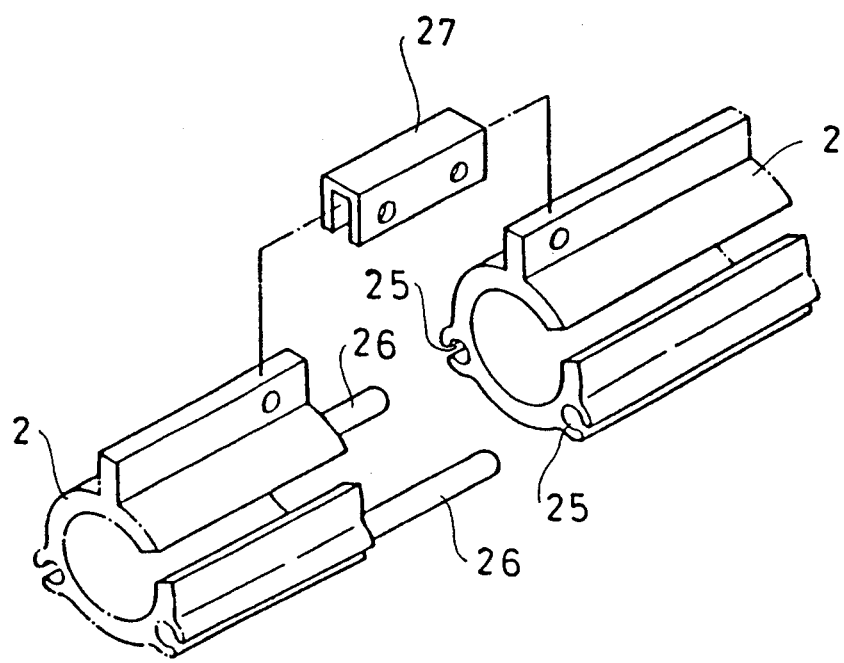
FIG. 56 is a perspective view showing an assembly of a chute as shown in FIG. 54.

It is desired that a chute 2 is so made that it can be connected to another. A chute 2 as shown in FIG. 54 has insertion openings 25 extending in the longitudinal direction as shown in FIG. 56 and connecting pins 26 are to be inserted in the insertion openings 25. Chutes may be connected with each other by means of a connector 27 having screw holes and the slits 20 of the chutes can be aligned.

Attachment portions 21 are provided to a chute 2, as shown in FIG. 57. The chute 2 is then attached to an auxiliary frame 12 by means of bolts 85 and nuts 86. A cable receiving table 34 is provided to the top part of a plate shaped tongue 31 projecting from a shuttle 3. A cable(C) is laid on the cable receiving table 34 by means of a connecting rope inserted through a connecting hole 36. A rail 24 is provided to each edge part of the attachment portion 21. Wheels 35 are provided to the tongue 31 so as to run on the rails 24. As the wheels 35 run on the rails 24, the cable(C) laid on the cable receiving table 34 is drawn onto the cable receiver 1.

Attachment portions 21 as shown in FIG. 58 are provided to a chute 2. The chute 2 is attached to the bottom wall of a cable receiver 1 by means of bolts 87 and nuts 88. A cable hanger 37 is provided to the top of a plate shape tongue 31 of a shuttle 3. The cable hanger 37 hangs and holds cables(C) by means of connecting ropes inserted in connecting holes 38.

FIGS. 59 to 63 show a cable laying operation utilizing such cable laying kits.

Figure 59:
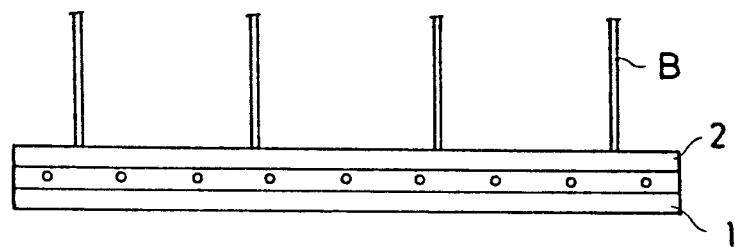
FIGS. 59 to 63 are diagramatic side views showing a process to lay a cable utilizing a cable laying device comprising a chute with an attachment portion.
Figure 60:
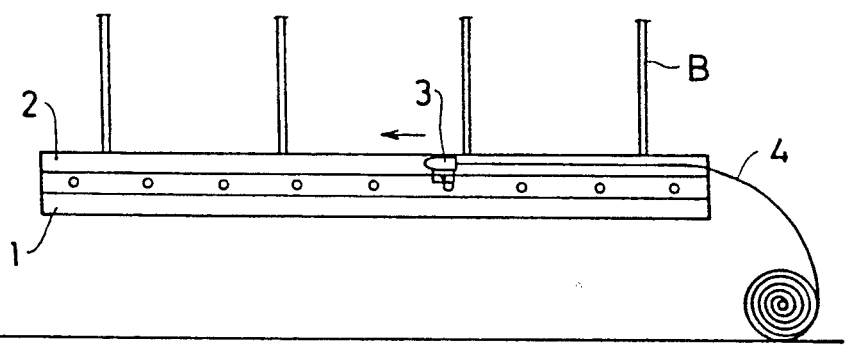
Figure 61:
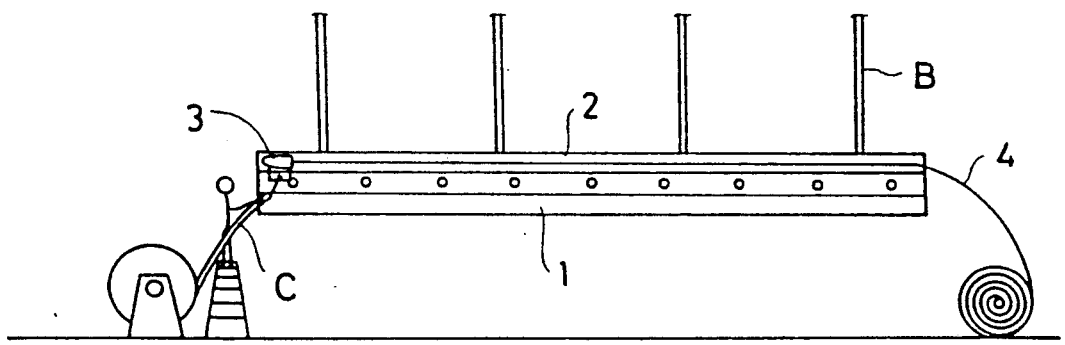
Figure 62:
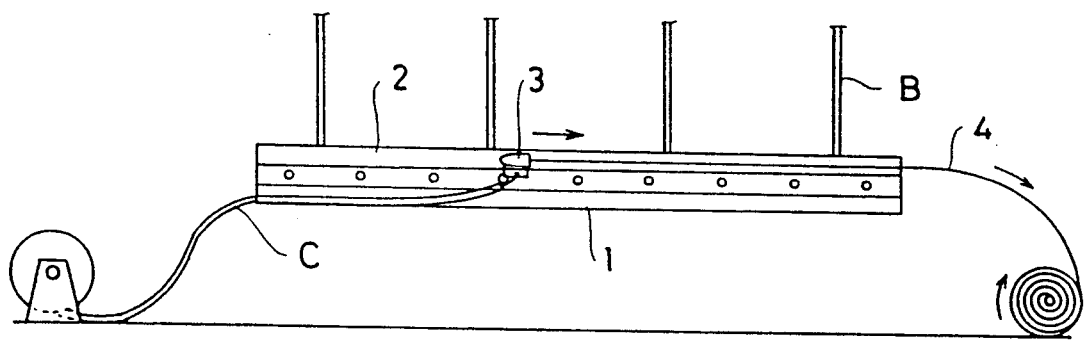
Figure 63:
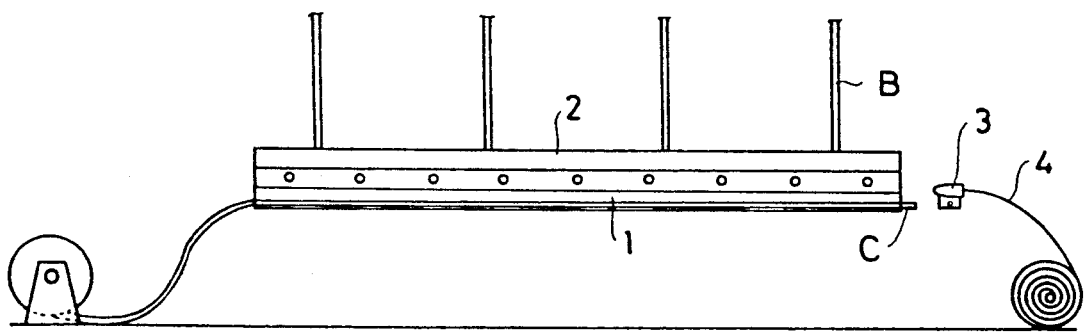

A chute 2 is attached to a cable receiver 1 as shown in FIG. 59. A shuttle 3 and a rope 4 are inserted into the chute 2 as shown in FIG. 60. A cable(C) is connected to the shuttle 3 by means of a connecting rope or the like as shown in FIG. 61. The rope 4 is dragged to draw back the shuttle 3 and the cable(C) is drawn as well onto the cable receiver 1 as shown in FIG. 62. The cable(C) is then released from the shuttle 3 and is laid on the cable receiver 1 as shown in FIG. 63.

Figure 64:
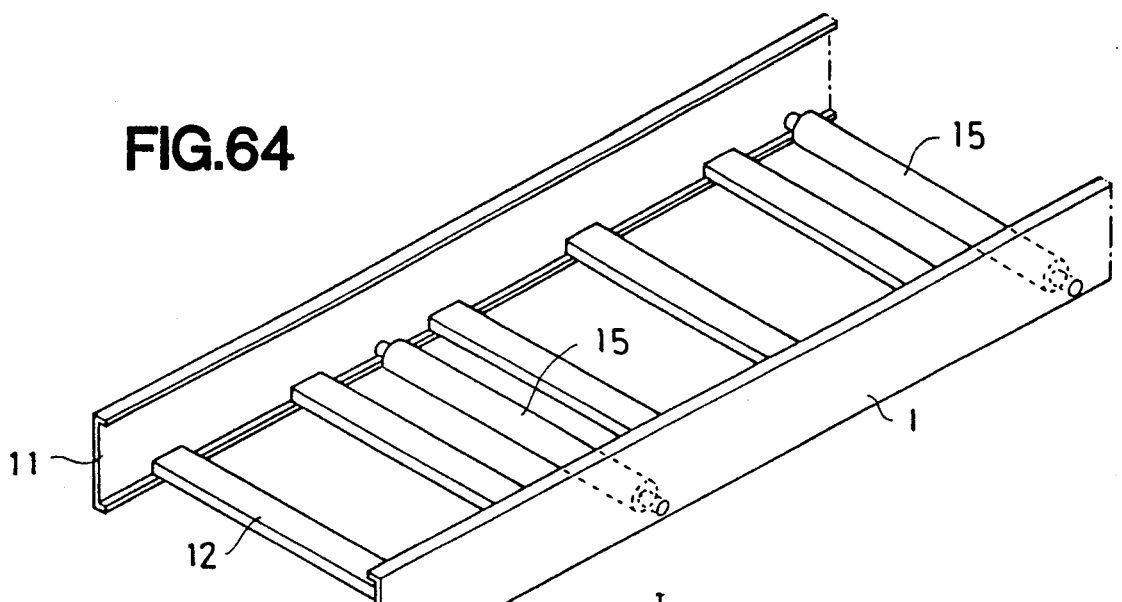
FIGS. 64 to 66 are perspective views showing a process to lay a cable with the use of a chute attachable to a cable receiver.
Figure 65:
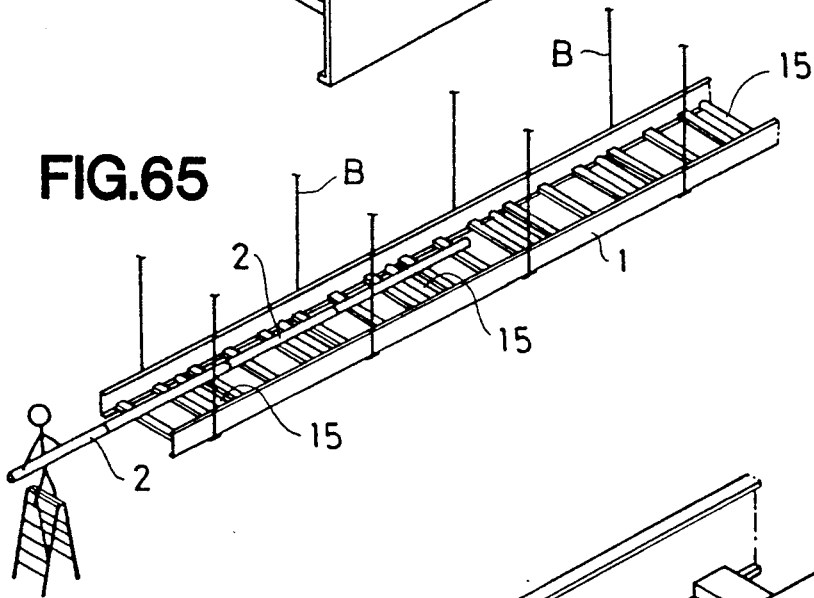
Figure 66:
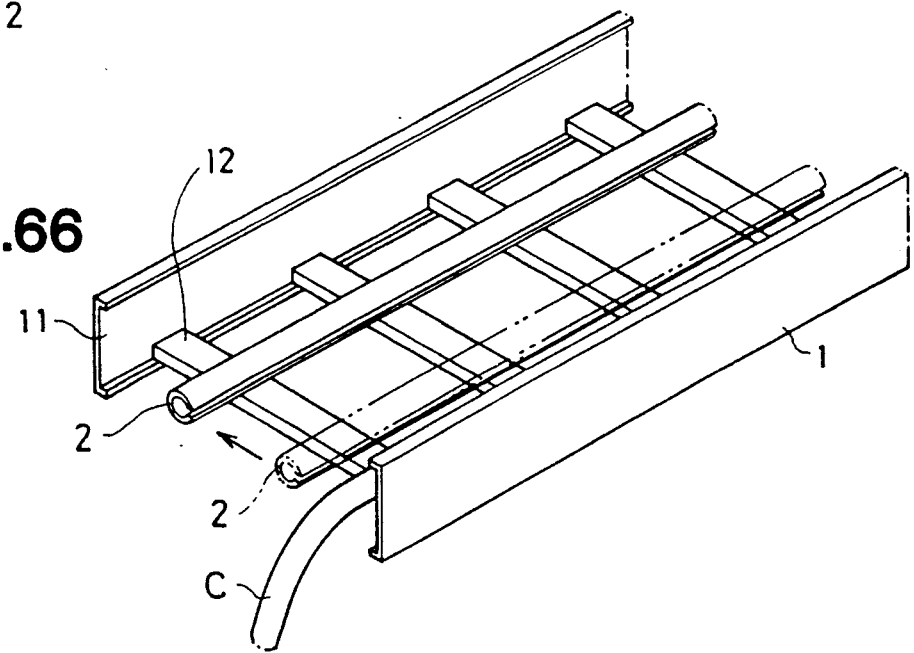

FIGS. 64 to 66 show another cable laying operation wherein a cable(C) is to be laid on an existing cable receiver 1 which is fixed to a ceiling by means of hanging bolts(B). Chutes 2 are to be attached to the auxiliary frames of the cable receiver 1.

As shown in FIG. 64, a plurality of rollers 15 are provided to desired positions of the main frames 11 in order to guide the chutes 2 in the longitudinal direction of the cable receiver 1.

Chutes 2 each being a few meters long are pushed on the auxiliary frames 12 from one end of the cable receiver 1, as shown in FIG. 65, and the chutes 2 are connected one after another. The connected chutes 2 are then pushed on rollers 15. It is preferred to devide bar-like rollers 15 into a plurality of ring-shape pieces to attain a better rolling performance.

When the chutes 2 reach the other end of the cable receiver 1, the chutes 2 are fixed to the auxiliary frames 12 by means of fastners. A shuttle 3 and a rope 4 are inserted in the chutes 2. A cable(C) is then connected to the shuttle 3 and the rope 4 is dragged to draw back the shuttle 3. The cable(C) is then released from the shuttle 3 to be laid on the cable receiver 1.

When another cable(C) need be laid, fasteners fixing the chutes 2 to the cable receiver 1 are detached to move the chutes 2 as shown in FIG. 66. When the chutes 2 are moved to a desired position, the chutes 2 are again fixed to the cable receiver 1.

EMBODIMENT 3

FIGS. 67 to 86 show the third embodiment.

A chute 2 has an attachment portion or portions 22 to be attached to a wall(W) or a ceiling. The wall(W) may be of a material such as concrete, wood, plastic or the like, or a panel or the like. The wall(W) may also comprise a plate material or bar materials attached thereto for fixing a chute 2.

Figure 67:
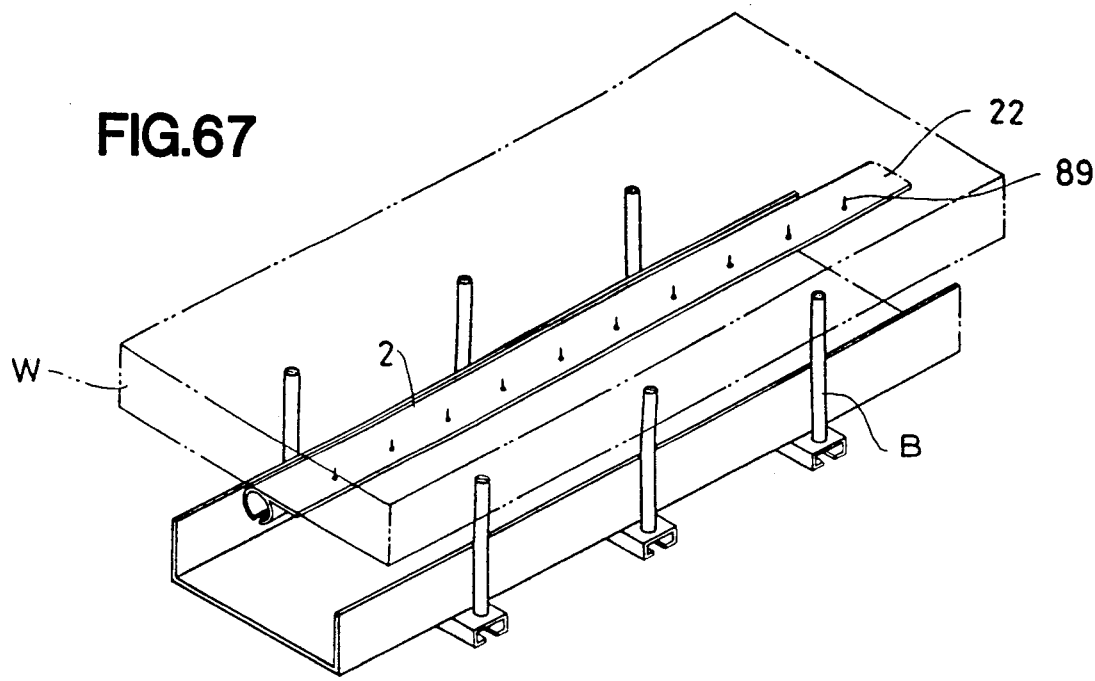
FIGS. 67 to 69 are perspective views showing cable laying devices comprising a chute with an attachment portion to be attached to a wall.
Figure 68:
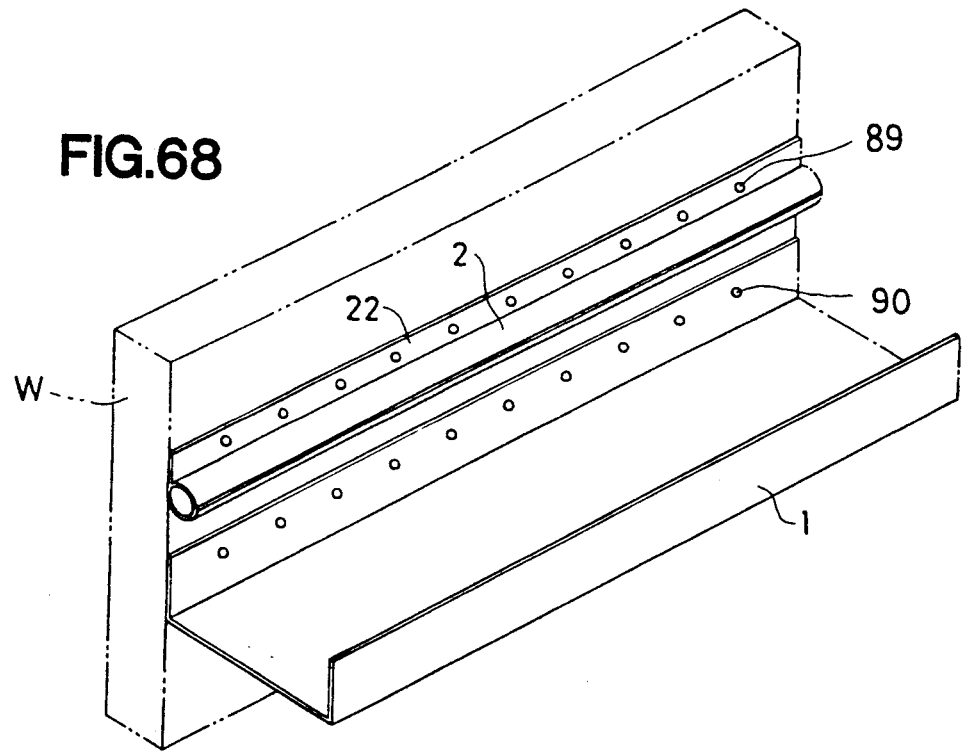
Figure 69:
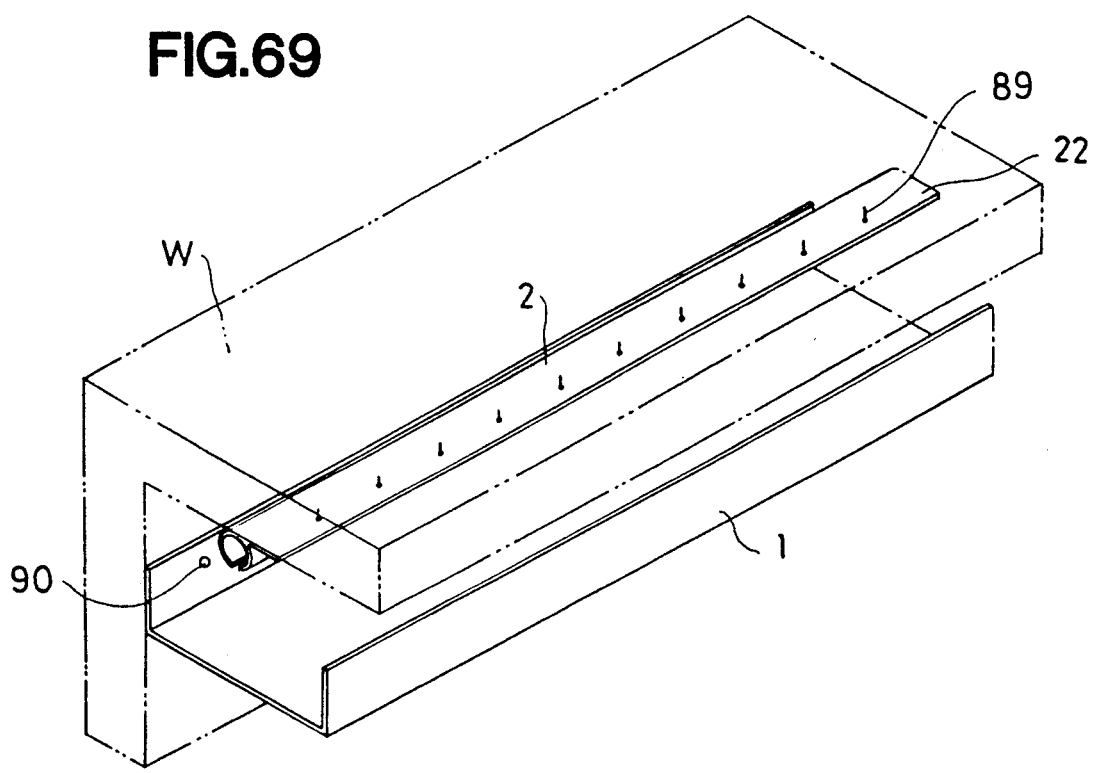

A plate shape attachment portion 22 is provided to a chute 2 as shown in FIGS. 67 to 69. The chute 2 is fixed to a wall(W) with the attachment portion 22 by means of screws 89. A cable receiver 1 is attached to a wall(W) by means of screws 90. The chute 2 may also be attached by means of adhesive or the like. Regardless of the shape of a cable receiver 1, the cable laying operation using the above mentioned kit is performed without receiving any adverse influence.

A chute 2 is formed a few meters long each or formed to have a length corresponding to that of a cable receiver 1. A plurality of chutes 2 are connected and installed. Slits 20 should be all aligned.

Figure 70:
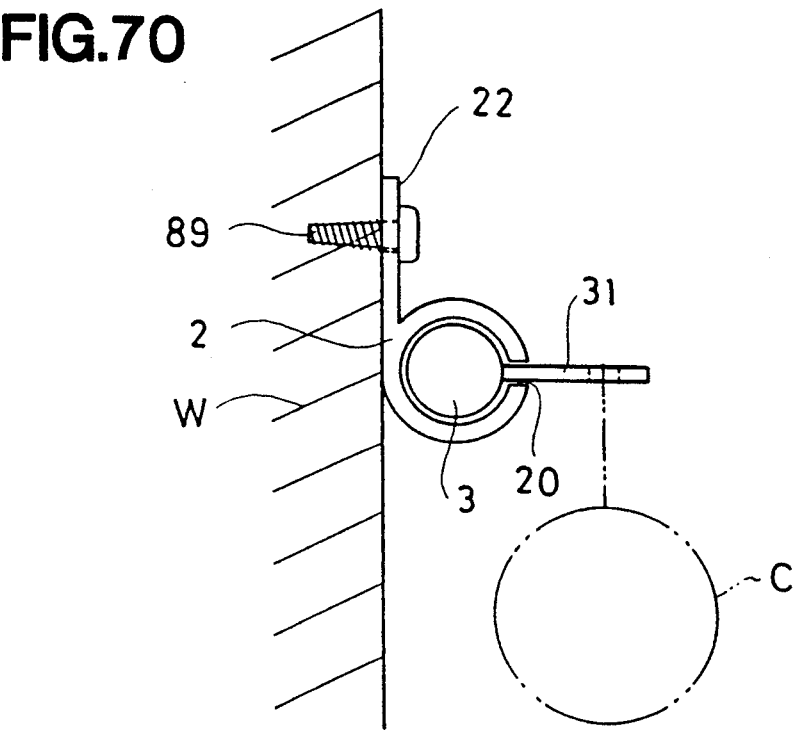
FIGS. 70 to 73 are sectional views showing cable laying kits as inserted in a chute.
Figure 71:
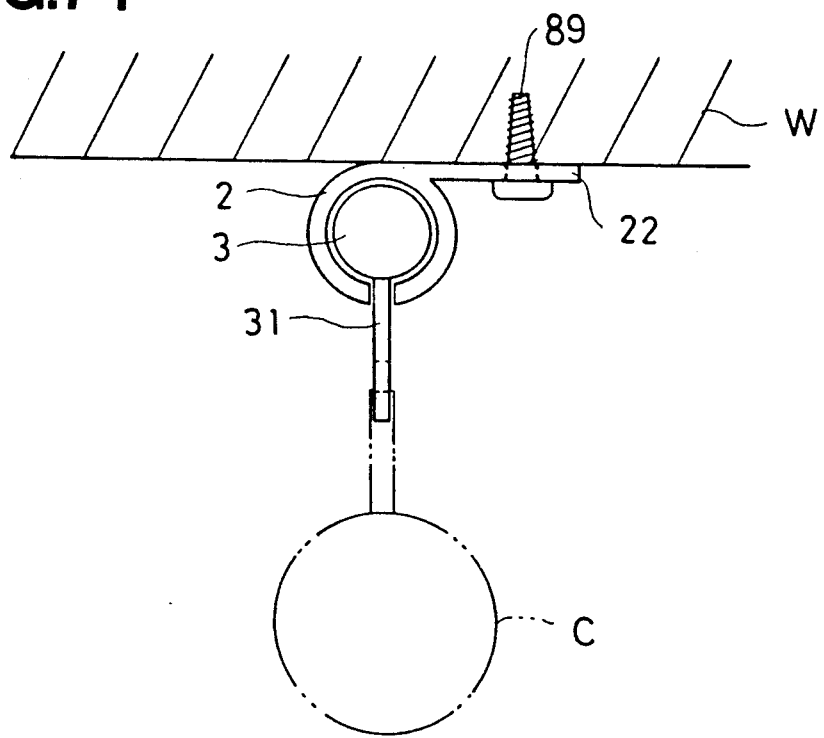
Figure 72:
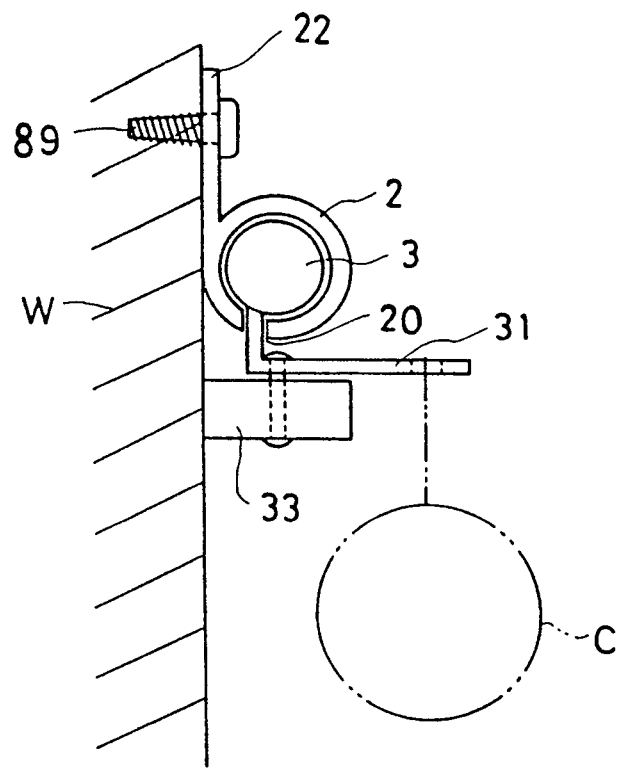
Figure 73:
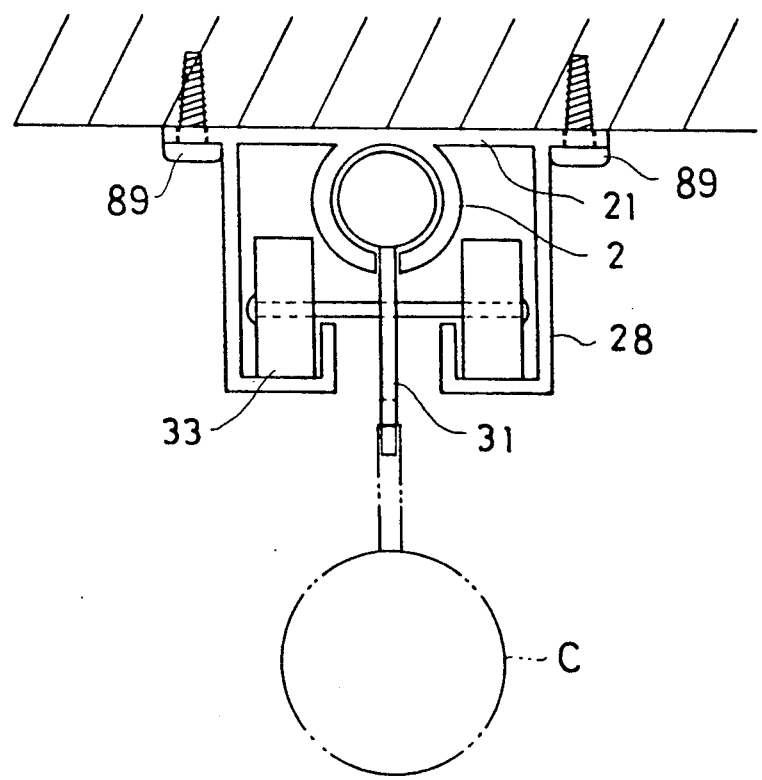
Figure 74:
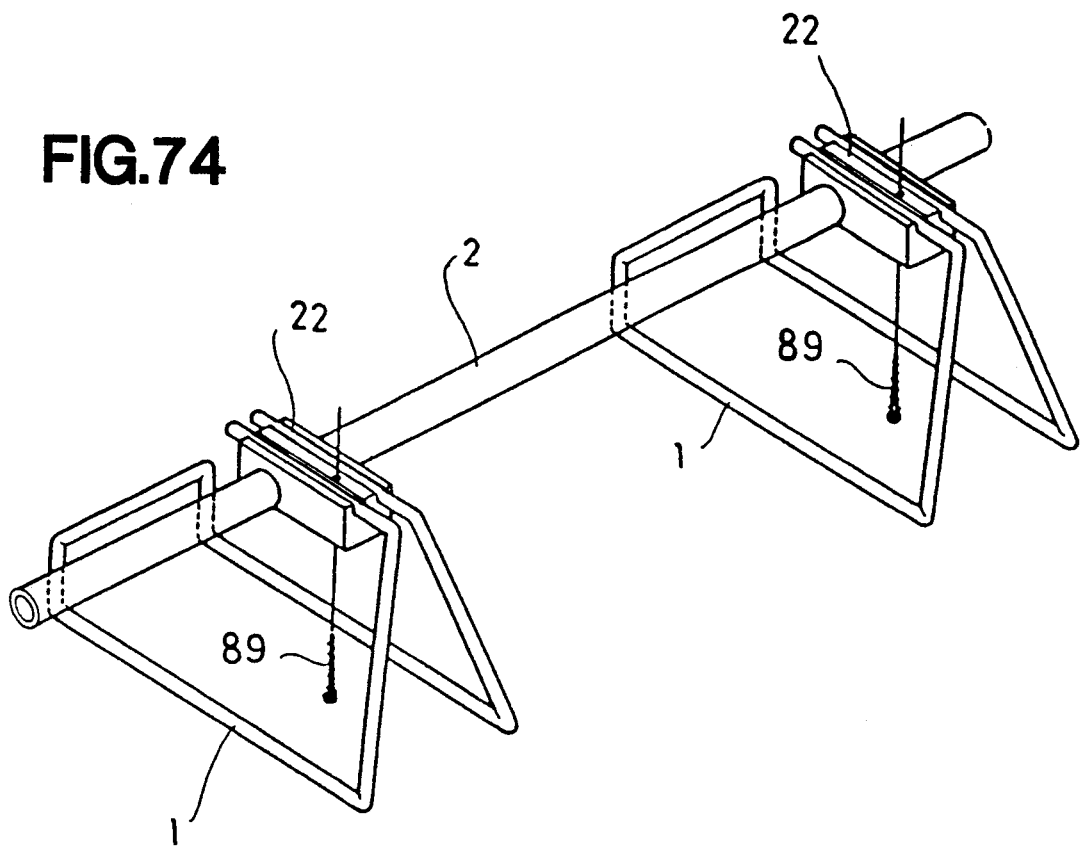
FIG. 74 is a perspective view showing a cable laying device comprising a chute with an attachment portion to be attached to a wall.

A chute 2 has a shuttle 3 with a tangue 31 go through within as shown in FIGS. 70 and 71. Rollers 33 may be provided as shown in FIGS. 72 and 73.

FIGS. 74 to 81 show cable laying devices each having a plurality of cable receivers 1 arranged in the cable laying direction. The cable receivers 1 are formed of thick wire material or plate material.

Figure 75:
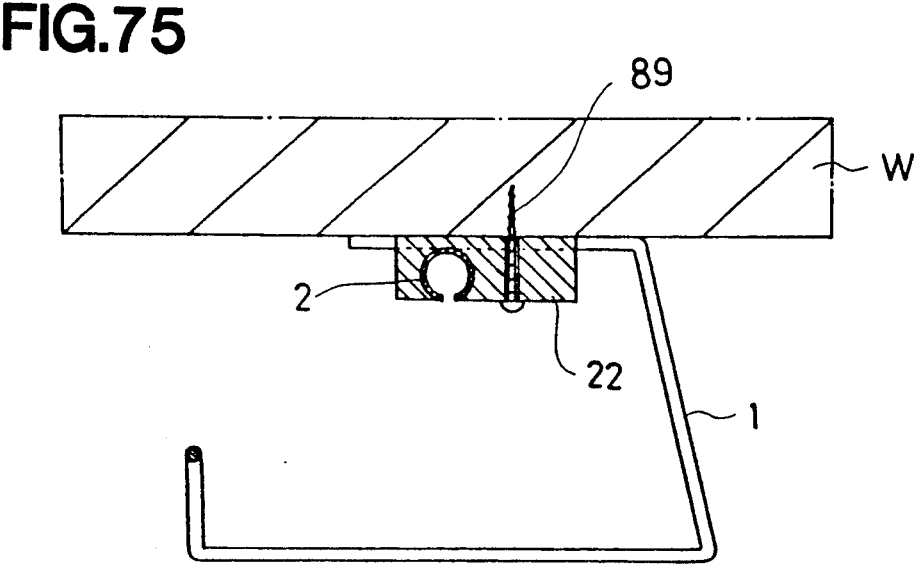
FIG. 75 is a sectional view showing a cable laying device as shown in FIG. 74.
Figure 76:
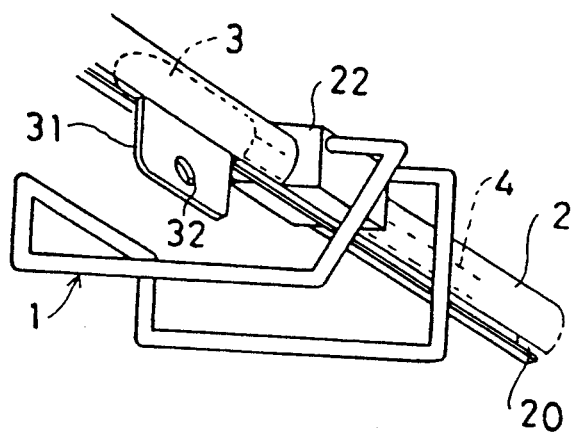
FIGS. 76 to 78 are perspective views showing cable laying devices such as shown in FIG. 74.
Figure 77:
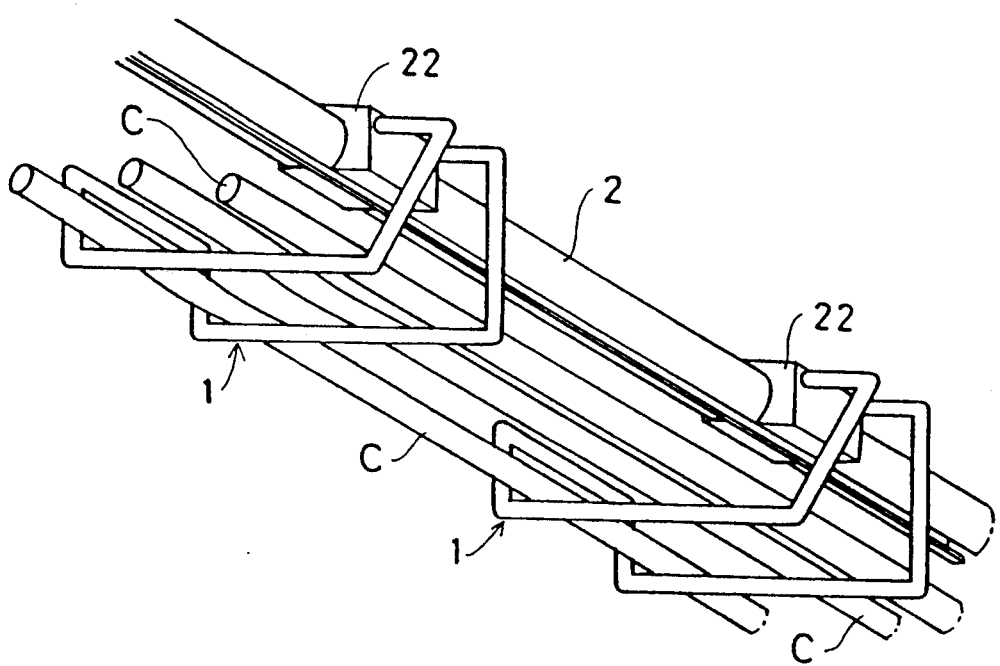

Such a cable laying device has a pipe portion and a block shape attachment portions 22 to hold the pipe portion. A screw hole is provided to the block shape attachment portion 22. The chute 2 is fixed to a wall(W) by means of the screws 89 as shown in FIG. 75. The block shape attachment portion 22 of the chute 2 is used to attach a cable receiver 1. As shown in FIG. 76, a shuttle 3 having a rope 4 is inserted in the chute 2. A tongue 31 of the shuttle 3 projects from a slit 20. A cable(C) is connected to the tongue 31 by means of a connecting rope. The rope 4 is dragged to draw the shuttle 3 and then the cable(C). As shown in FIG. 77, the cable(C) is laid on the cable receiver 1 as a result of the operation.

Figure 78:
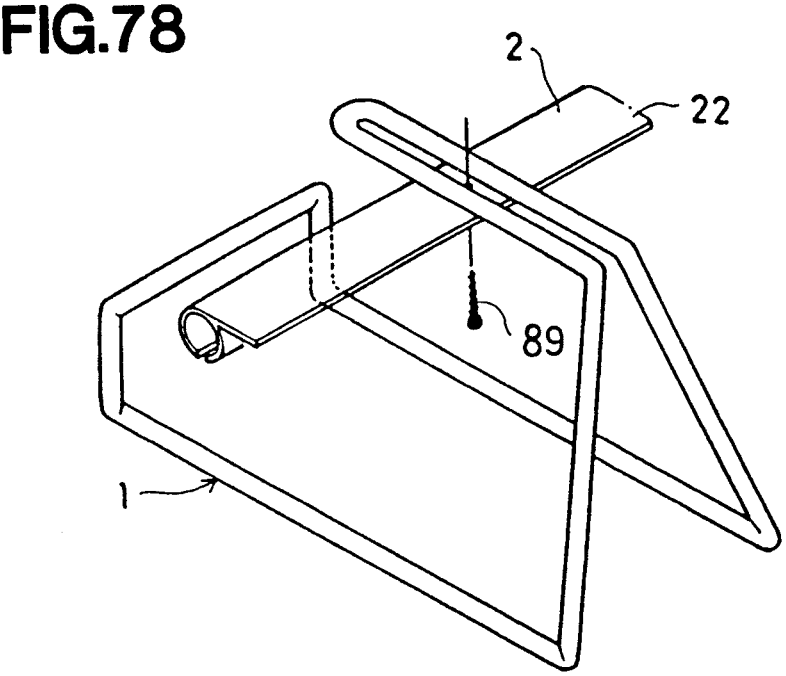
Figure 79:
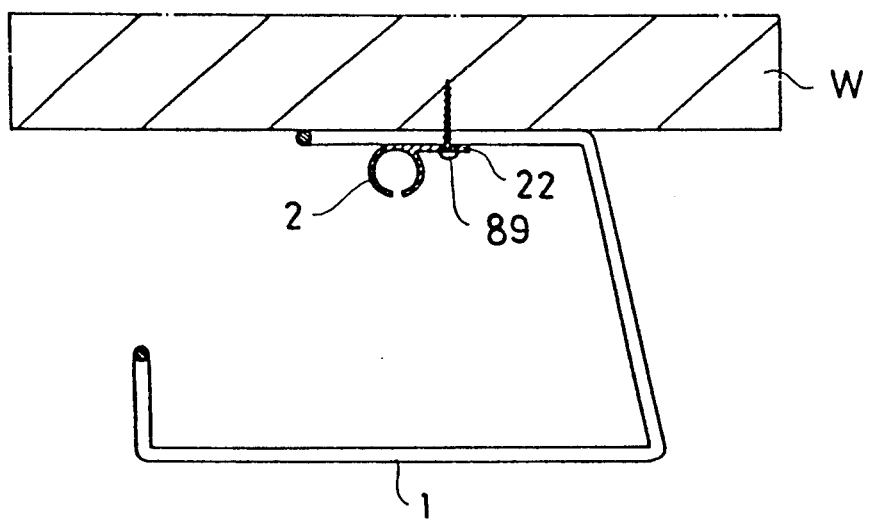
FIG. 79 is a sectional view showing a cable laying device as shown in FIG. 78.

A plate shape attachment portion 22 is formed on a chute 2 extending as shown in FIGS. 78 and 79. The chute 2 may be attached to a wall(W) with a screw 89. The cable receiver 1 formed of a bent wire material is fixedly held between the attachment portion 22 and the wall(W).

Figure 80:
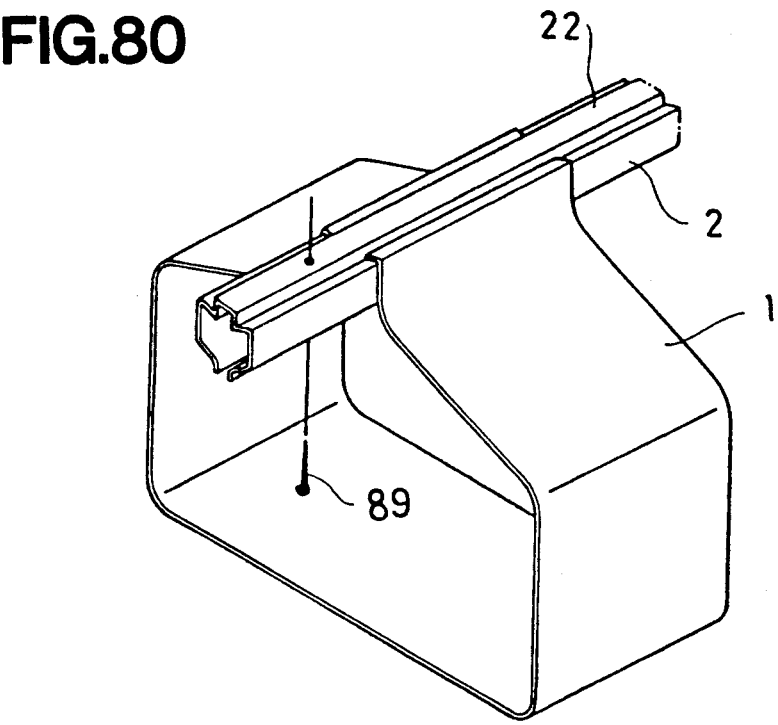
FIG. 80 is a perspective view showing another cable laying device comprising a chute with an attachment portion to be attached to a wall.
Figure 81:
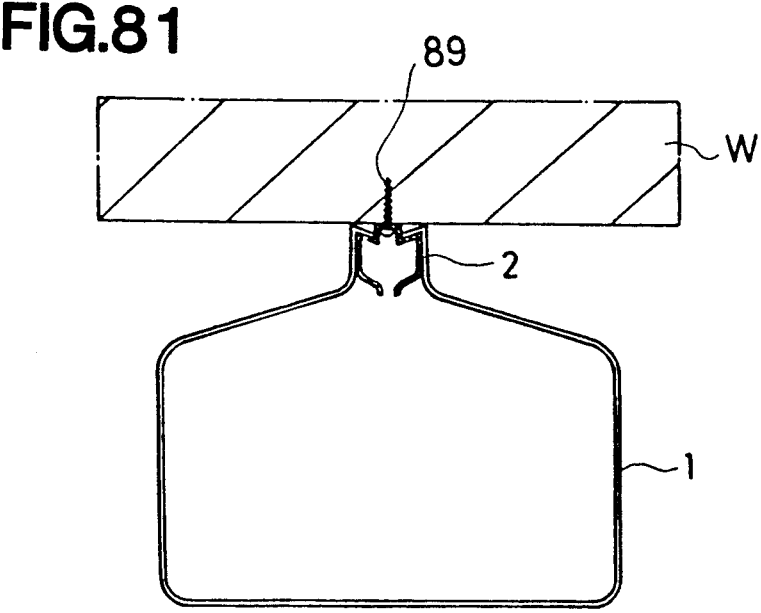
FIG. 81 is a sectional view showing a cable laying device as shown in FIG. 81.

The top part of a chute 2 is so made as to be a flat attachment portion 22 as shown in FIGS. 80 and 81. The pipe portion of the chute 2 wherein a shuttle 3 is to be inserted has flat hooking portions. The bent ends of a cable receiver 1 can be hooked on the flat hooking portions and the chute 2 is fixed to a wall(W) with screws 89.

When cable receivers 1 as shown in FIGS. 74 to 81 are used, the installment of cable receivers 1 is relatively easy.

FIGS. 82 to 86 show another cable laying operation.

Figure 82:
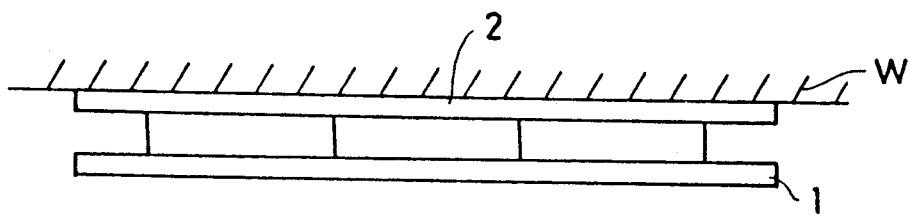
FIGS. 82 to 86 are diagramatic side views showing a process to lay a cable utilizing a cable laying device comprising a chute with an attachment portion to be attached to a wall.
Figure 83:
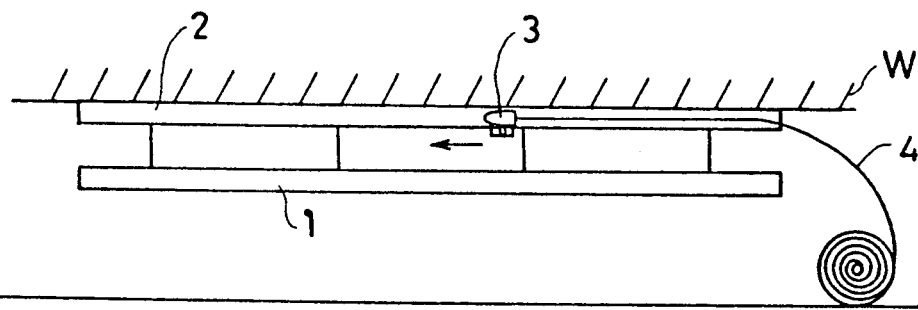
Figure 84:
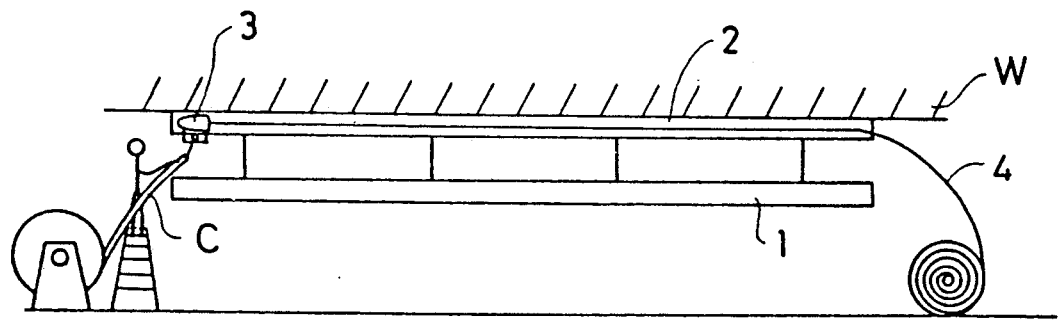
Figure 85:
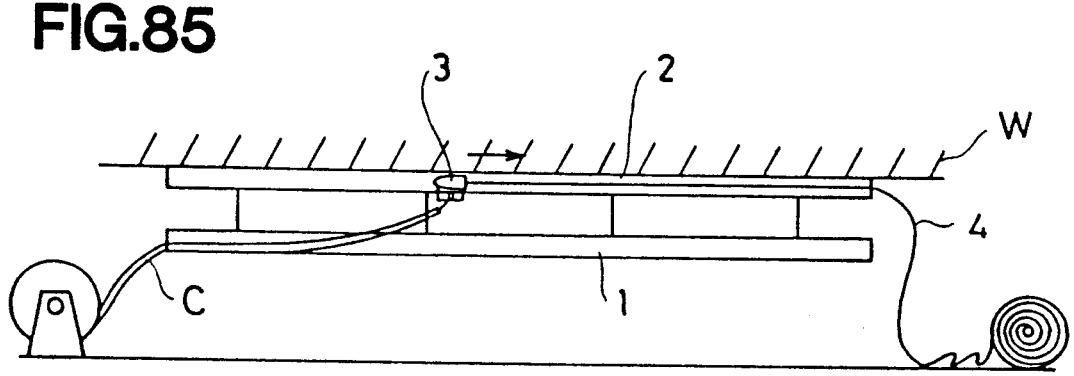
Figure 86:
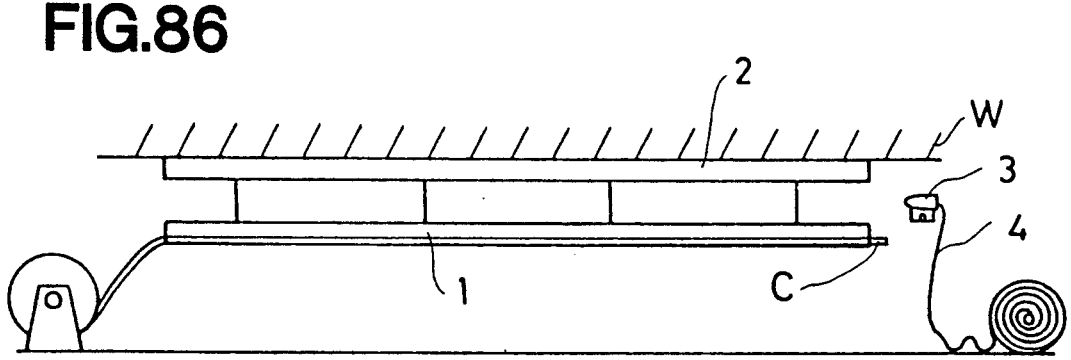

As shown in FIG. 82, a chute 2 is attached to a wall(W) to come above a cable receiver 1. A shuttle 3 and a rope 4 are inserted in the chute 2 as shown in FIG. 83. A cable(C) is connected to the shuttle 3 by means of a connecting rope as shown in FIG. 84. The rope 4 is dragged to draw back the shuttle 3 and the cable(C) as shown in FIG. 85. The cable(C) is then released from the shuttle 3 and it is laid on the cable receiver 1.

Though a single chute 2 is attached to a ceiling wall(W) in this example cable laying operation, as shown in FIGS. 67 and 69, a plurality of chutes may also be attached.

EMBODIMENT 4

FIGS. 87 to 101 show the fourth embodiment.

A cable laying device comprises an installment bar 5 distributed above a cable receiver 1, a chute 2 which is attached to the installment bar 5, a shuttle 3 and a rope 4.

Figure 87:
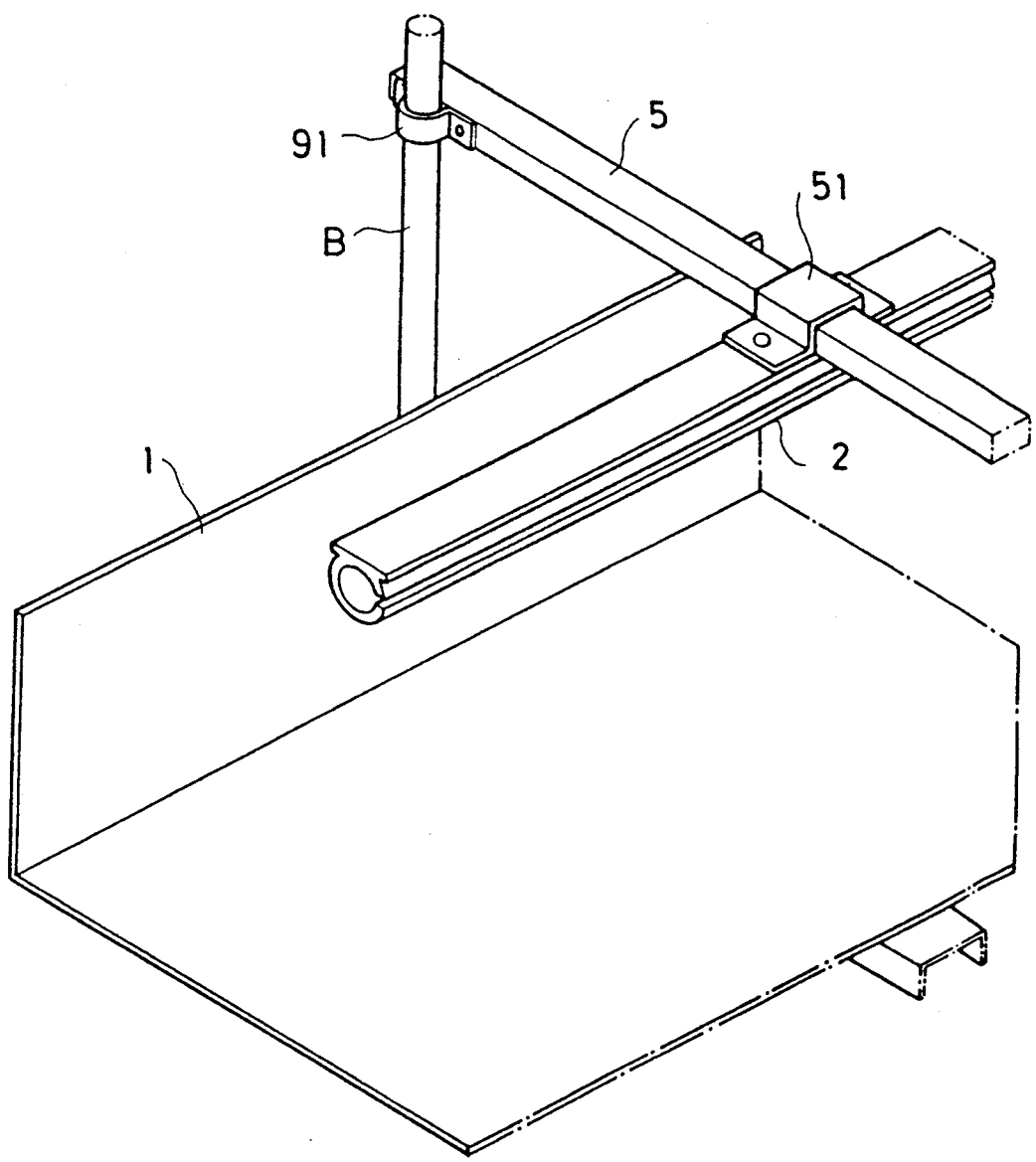
FIG. 87 is a perspective view showing a cable laying device comprising a chute attached to a frame.

An installment bar 5 is needed to distribute a chute 2 above a cable receiver 1, which can take a shape of circular, rectangular or virtually any in cross section. An installment bar 5 may be made of metal, wood, synthetic resin or the like. As shown in FIG. 87, an installment bar 5 is attached to a hanging bolt(B) by means of a fastener 91. The hanging bolt(B) supports the cable receiver 1 and the installment bar 5 which is located above the cable receiver 1. The installment bar 5 may be attached to a steel material or the like which is distributed at a ceiling wall or a wall other than a hanging bolt(B). The installment bar 5 may also be bridged over a cable receiver 1 between the side walls of the cable receiver 1.

Figure 88:
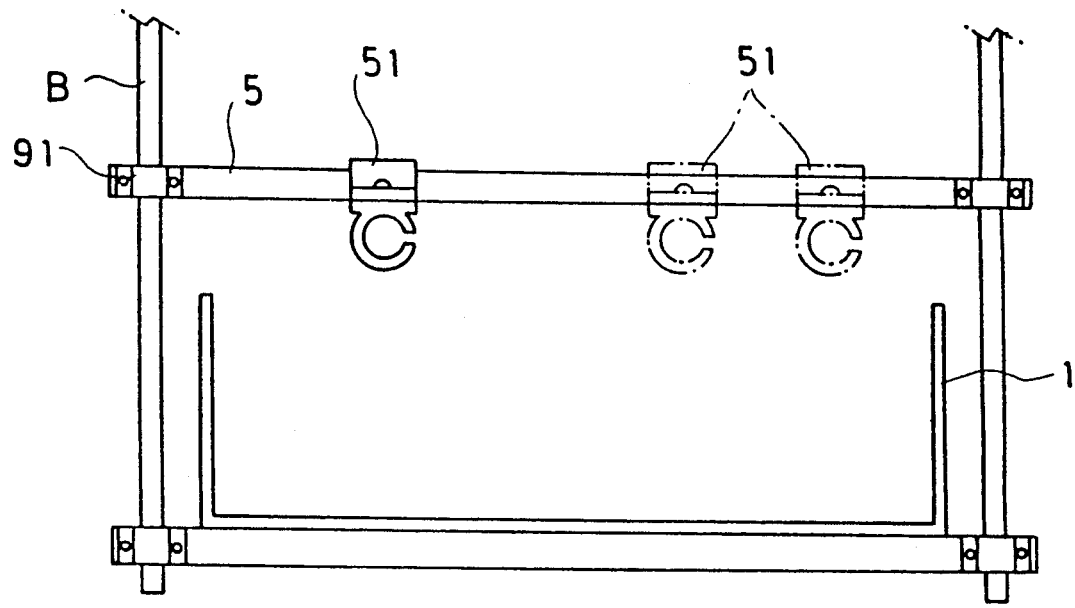
FIG. 88 is a front view showing a cable laying device as shown in FIG. 87.
Figure 89:
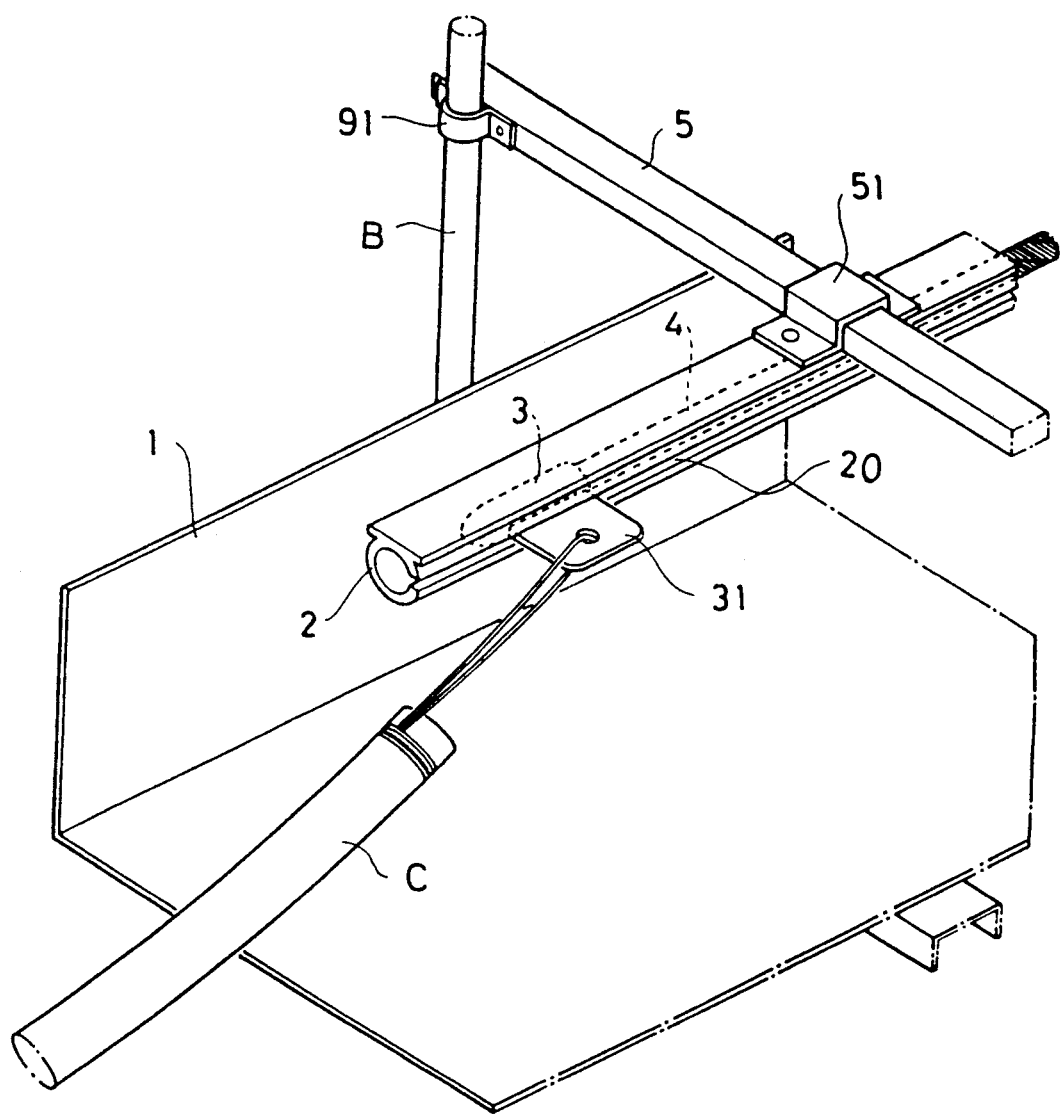
FIG. 89 is a perspective view showing a cable laying device as shown in FIG. 87, as a cable is drawn.

A chute 2 is attached to the installment bar 5 by means of an attachment fastener 51 as shown in FIG. 87. The chute 2 may be slided on the installment bar 5 to a desired position above the cable receiver 1 by loosening the screws of the attachment fastener 51 as shown in FIG. 88. As shown in FIG. 89, a shuttle 3 and a rope 4 are inserted in the chute 2. A cable(C) is connected to a plate shape tongue 31 projecting from the shuttle 3 so that the cable(C) is drawn onto the cable receiver 1.

Figure 90:
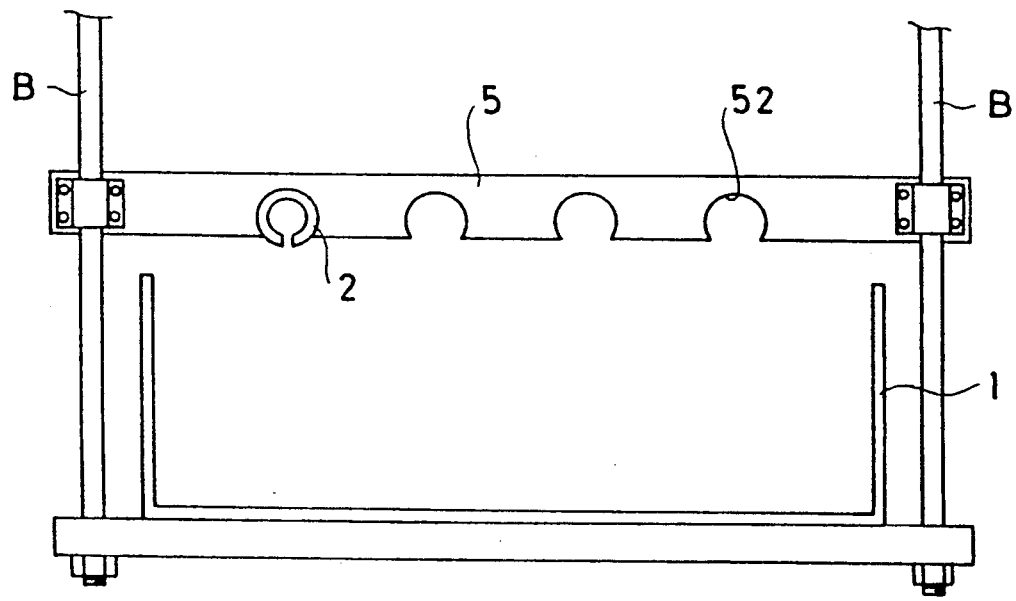
FIG. 90 is a front view showing another type of a frame.

An installment bar 5 may have a plurality of recesses 52 made in a shape corresponding to the shape of a chute 2, such that the chute 2 may be distributed in the recesses 52 as shown in FIG. 90. With the distribution of the chute 2 in a recess 52, the chute 2 is attached to the installment bar 5.

Figure 91:
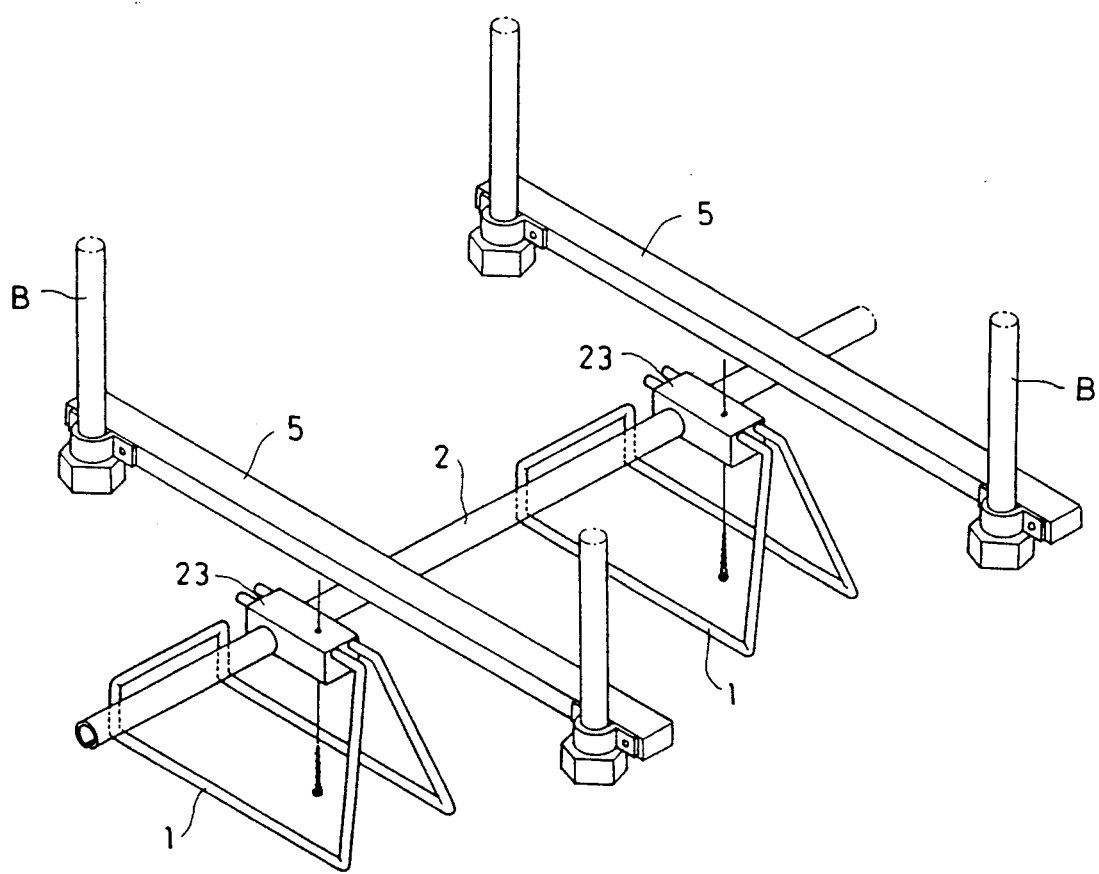
FIG. 91 is a perspective view showing still another cable laying device comprising a cable receiver.

As shown in FIG. 91, a cable receiver 1 is formed with a bent wire material. A chute 2 has a pipe portion wherein a shuttle 3 is to be inserted and also a block shape attachment portion 23. The cable receiver 1 and the chute 2 are attached together to an installment bar 5 which is attached to a hanging bolt(B).

Figure 92:
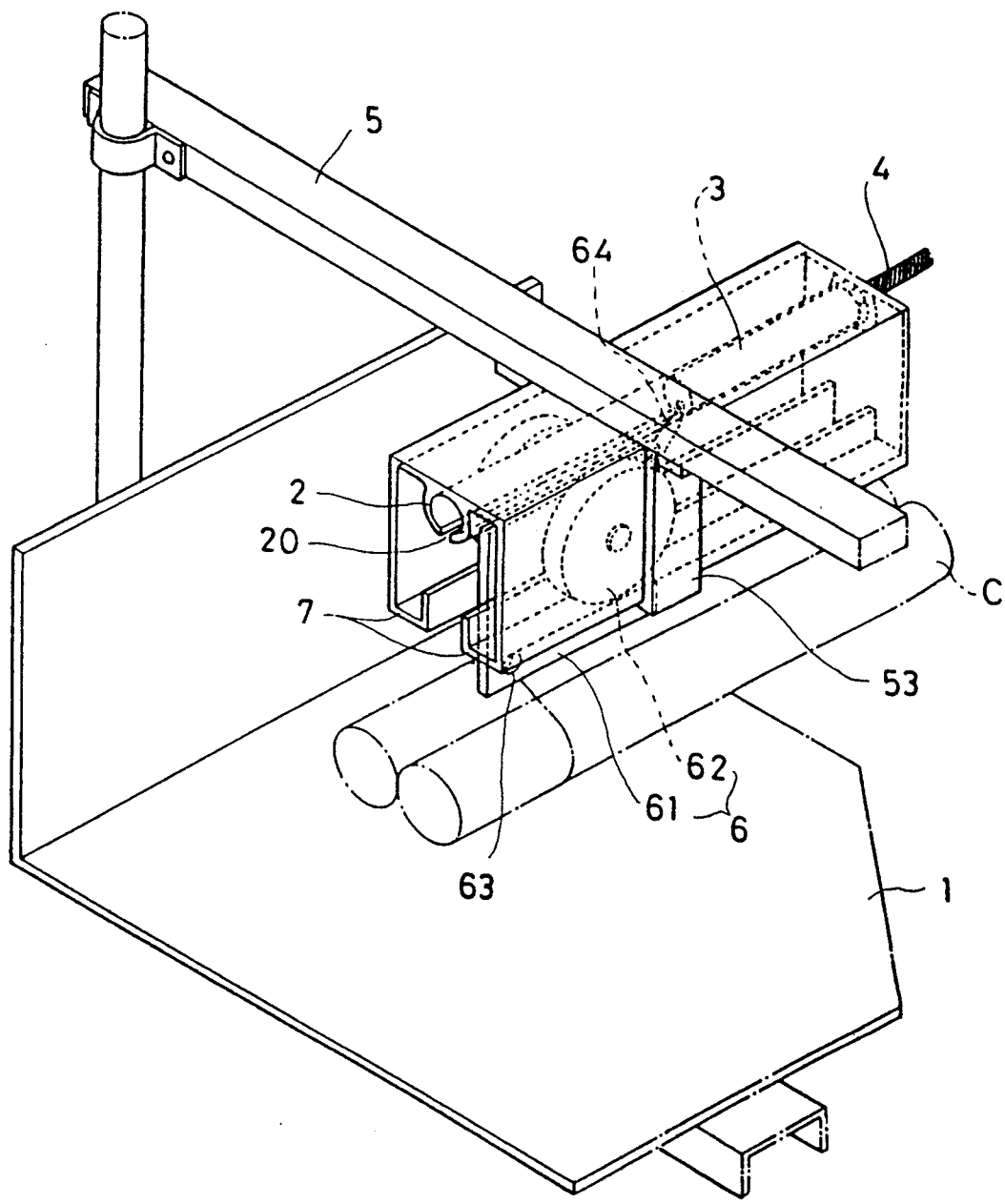
FIG. 92 is a perspective view showing a cable laying device comprising a chute attached to a frame.
Figure 93:
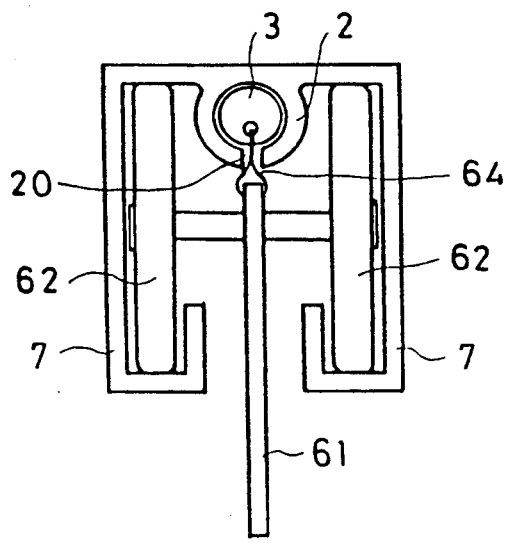
FIG. 93 is a front view showing a chute and a cable laying device as shown in FIG. 92.
Figure 94:
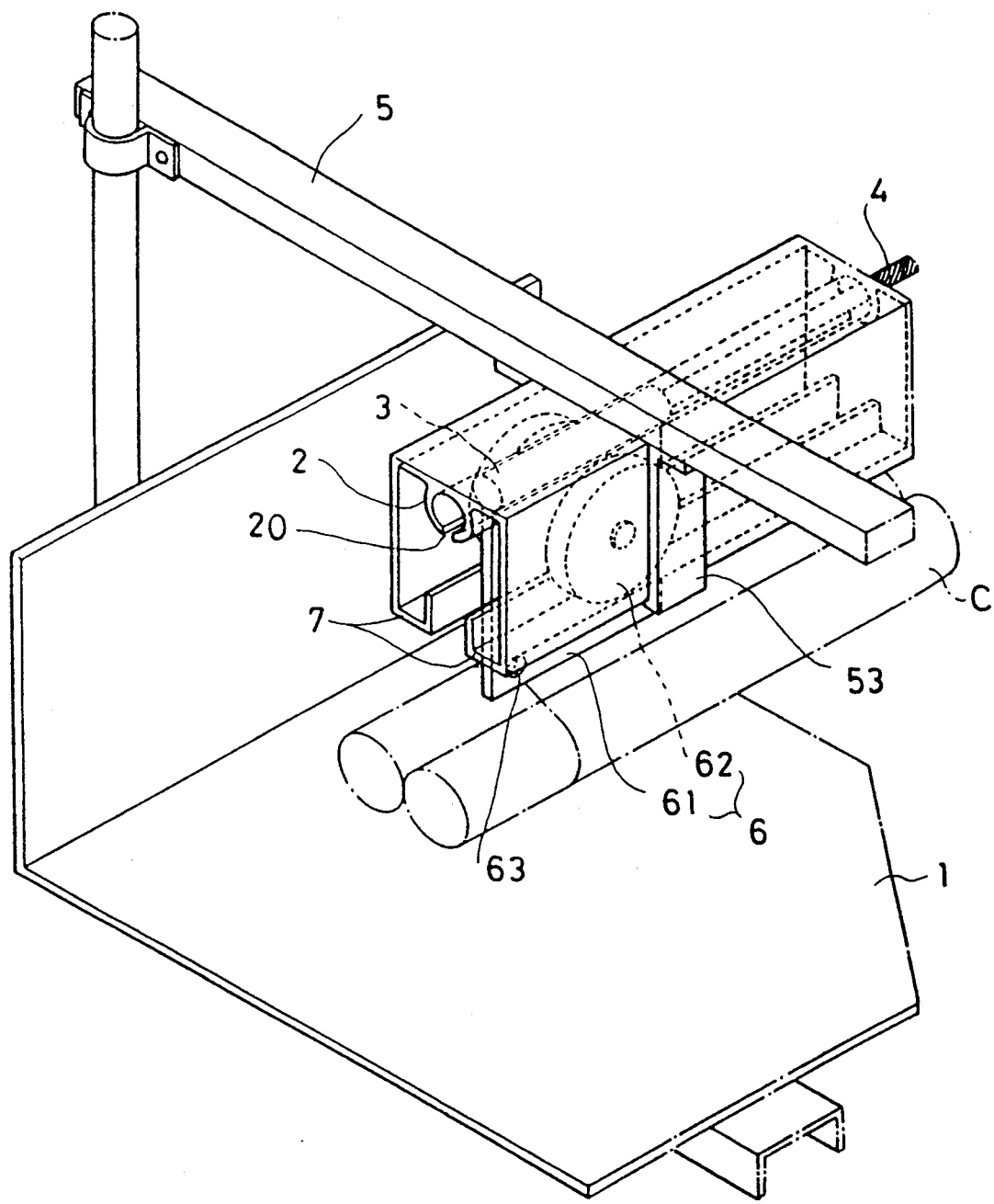
FIG. 94 is a perspective view showing another cable laying device comprising a chute attached to a frame.

A cable laying devices such as shown in FIGS. 92 and 94 comprise an installment bar 5 distributed above a cable receiver 1, a chute having a slit 20, a shuttle 3, a rope 4, a carrier 6 having rollers 62 and a connecting portion 61 to which a cable(C) or a second rope is connected, and a holder 7 distributed along the chute 2 to hold the carrier 6. The holder 7 also has rail surfaces for the rollers 62.

Figure 95:
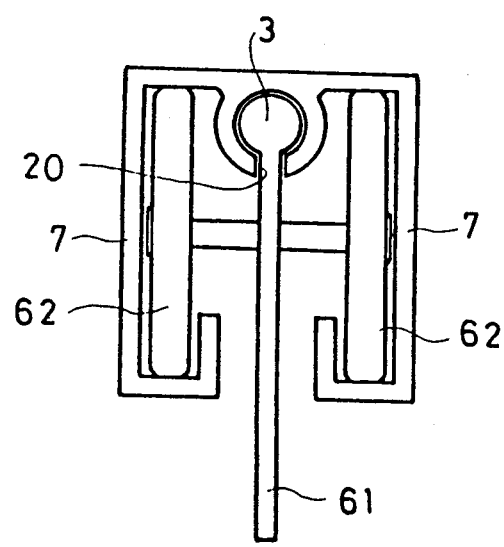
FIG. 95 is a front view showing a chute and a cable laying device as shown in FIG. 94.

The chute 2 is attached to the installment bar 5 by means of a fastener 53. The connecting portion 61 of the carrier 6 is made a plate shape. The connecting portion 61 has a connecting hole 63 to which a cable(C) or a second rope is connected. The carrier 6 is connected to the shuttle 3 by means of a rope 64 as shown in FIG. 92. The carrier 6 is incorporated in the shuttle 3 in the case such as shown in FIG. 94, which is also shown in FIG. 95.

In the forgoing cable laying devices, a shuttle 3 can pass through a chute 2 smoothly with the help of rollers 62. As a holder 7 holds a carrier 6, with a cable(C) being hung at the connecting portion 61, the holder 7 supports part of the weight of the cable(C) laid on the shuttle 3.

Figure 96:
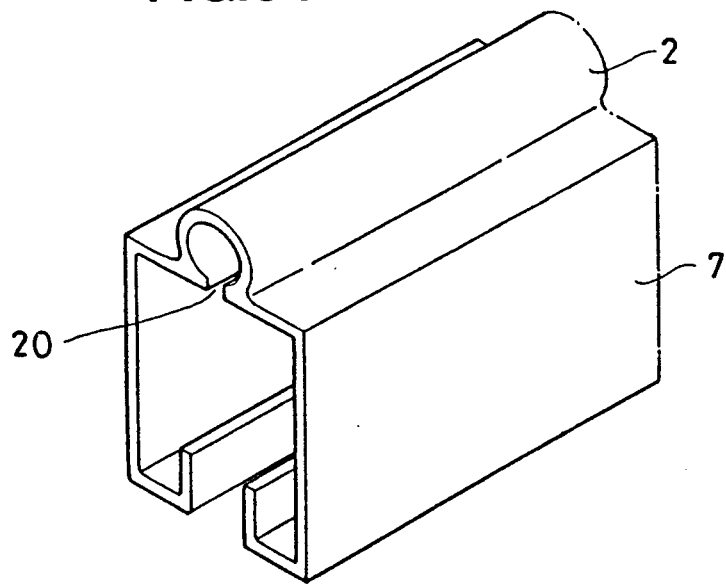
FIG. 96 is a perspective view showing another chute.

A chute 2 is provided to a holder 7 as shown in FIGS. 92 and 94. A chute 2 may be provided, as shown in FIG. 96, outside the holder 7. A chute 2 and a holder 7 need not be formed incorporated but may be formed separately and be assembled at the time of their use.

A holder 7 may be formed of metal or synthetic resin by pressing or extrusion-molding.

Accordingly, with the use of the foregoing cable laying device which has an attachment portion to an installment bar 5, a cable laying work is performed as shown in FIGS. 97 to 101.

Figure 97:
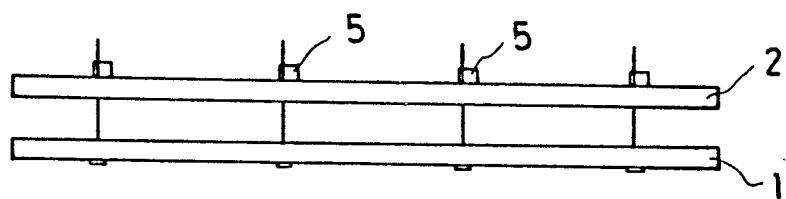
Figure 98:
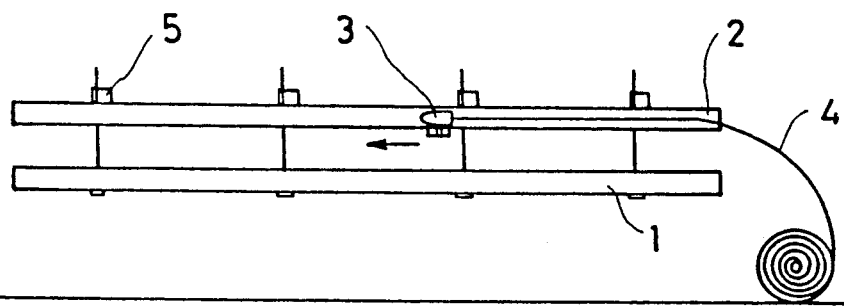
Figure 99:
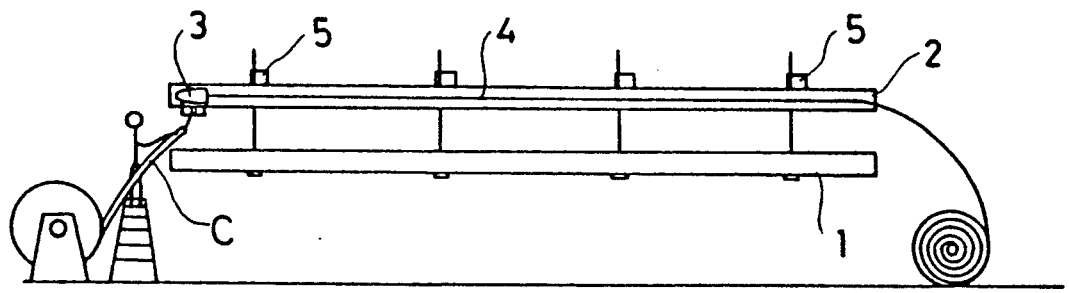
Figure 100:
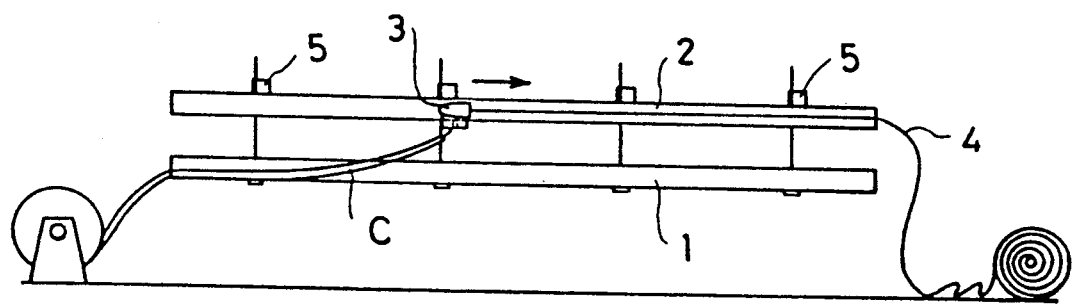
Figure 101:
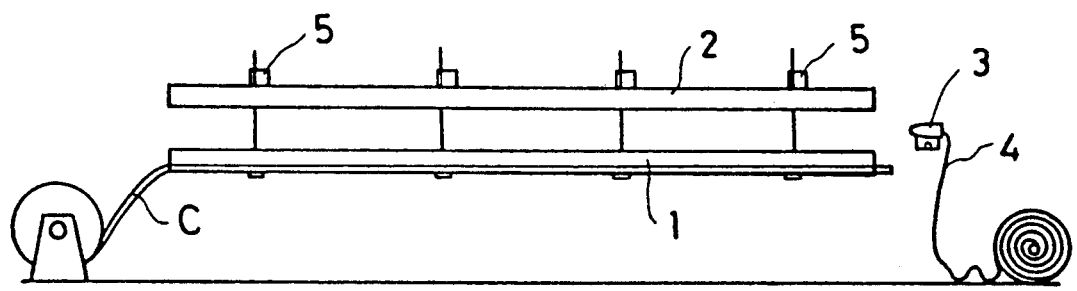
Figure 102:
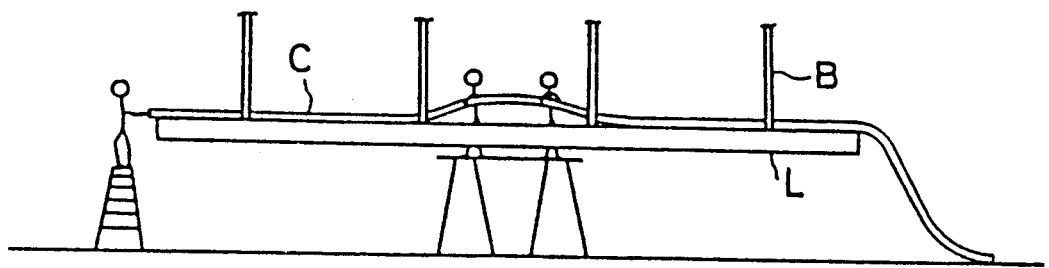
FIGS. 102 to 104 are diagramatic side views showing a conventional process to lay a cable.
Figure 103:
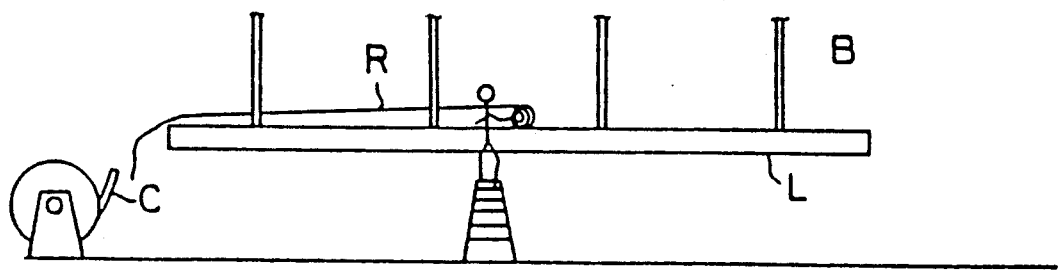
Figure 104:
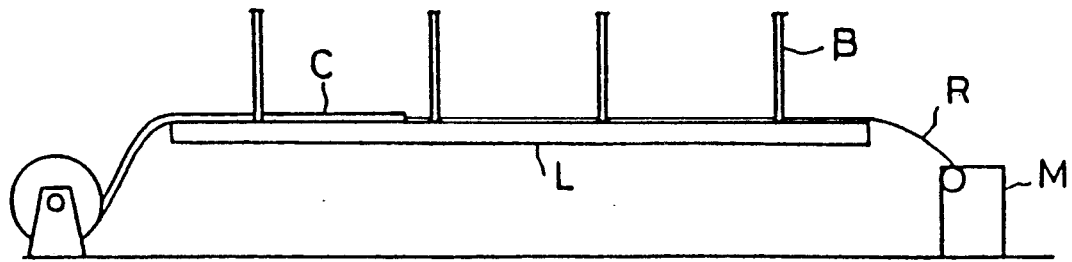

As shown in FIG. 97, an installment bar 5 is distributed above a cable receiver 1 to which a chute 2 is attached. As shown in FIG. 98, a shuttle 3 and a rope 4 are inserted in the chute 2. As shown in FIG. 99, a cable(C) is connected to the shuttle 3 by means of a connecting rope or the like. As shown in FIG. 100, the rope 4 is dragged to draw back the shuttle 3 and then a cable (C) onto the cable receiver 1. As shown in FIG. 101, the cable (C) is released from the shuttle 3 and it is laid on the calbe receiver 1.

In order to lay a plurality of cables(C) on a cable receiver 1, a plurality of chutes 2 may also be preparedly attached to an installment bar 5. In this manner, a plurality of cables(C) are also to be laid.

When a cable laying operation is over, the chute or chutes 2 can be detached from an installment bar 5 to be used again for another cable laying operation.

Although only several embodiments of the present invention have been set forth, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

I claim:

1. A cable laying method comprising the steps of:
   installing a cable receiver and a chute, said chute having a slit extending in the longitudinal direction thereof, said cable receiver and said chute being attached to a wall or a ceiling;
   inserting in said chute at a starting point a shuttle to which is connected a first rope hard enough to push itself in said chute, said shuttle having a cable connecting means for travelling within said slit;
   pushing said shuttle through said chute by means of said rope;
   connecting a cable to said shuttle at an ending point after said shuttle is sent through said chute;
   drawing back said shuttle to said starting point through said chute with said first rope and carrying said cable along said cable receiver and
   releasing said cable from said shuttle and laying said cable on said cable receiver.

2. A cable laying method comprising the steps of:
   installing a plurality of cable receivers and chutes, each of said chutes having a slit aligned with each other and extending in the longitudinal direction thereof, said cable receivers and said chutes being attached to a wall or a ceiling;
   inserting in said chutes at a starting point a shuttle to which is connected a first rope hard- enough to push itself in said chutes; said shuttle having a cable connecting means for travelling within said slit;
   pushing said shuttle through said chutes with said first rope;
   connecting a second rope to said shuttle at an ending point;
   drawing back said shuttle to said starting point through said chutes;
   connecting a cable to said second rope at said starting or ending point;
   drawing said second rope and said cable through said chutes;
   releasing said cable from said second rope and laying said cable on said cable receiver.

3. The method of claim 1 wherein said shuttle has a second rope connected thereto; and including the steps of
   releasing said second rope from said shuttle at an ending point;
   connecting a cable to said second rope at said ending point;
   drawing said second rope and said cable in said chute;
   releasing said cable from said second rope and laying said cable on said cable receiver.

4. A cable laying device comprising:
   a cable receiver and a chute, said chute having a slit extending in the longitudinal direction thereof; and
   a cable laying means said cable laying means comprising a shuttle having connecting means for connecting a cable or a second rope and a rope which is hard enough to push itself and said shuttle along said chute.

5. A cable laying device comprising:
   a chute with a longitudinal slit and a cable receiver, said chute and cable receiver having a means for attachment to a ceiling or wall; and
   cable laying means comprising a shuttle having a to which a cable or a second rope is to be connected, said connecting means being capable of travelling in said slit, also including a rope which is hard enough to push itself and said shuttle along said chute.

6. The method of claim 1 which comprises connecting a plurality of said chutes one after another along the cable route.

7. The cable laying device of claim 4 wherein a plurality of said chutes is connected one after another along the cable route.

8. The cable laying device of claim 5 including means for attaching said chute to a wall.

9. The cable laying device of claim 5 wherein said attachment means comprises an installment bar.

* * * * *